(12) United States Patent
Kim et al.

(10) Patent No.: US 12,369,122 B2
(45) Date of Patent: Jul. 22, 2025

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 474 days.

(21) Appl. No.: 17/792,118

(22) PCT Filed: Jan. 11, 2021

(86) PCT No.: PCT/KR2021/000316
§ 371 (c)(1),
(2) Date: Aug. 29, 2022

(87) PCT Pub. No.: WO2021/141467
PCT Pub. Date: Jul. 15, 2021

(65) Prior Publication Data
US 2023/0062989 A1    Mar. 2, 2023

(30) Foreign Application Priority Data

| Jan. 9, 2020 | (KR) | 10-2020-0003393 |
| Jan. 10, 2020 | (KR) | 10-2020-0003872 |
| May 21, 2020 | (KR) | 10-2020-0061071 |

(51) Int. Cl.
*H04W 52/02* (2009.01)
*H04L 9/40* (2022.01)
*H04W 84/12* (2009.01)

(52) U.S. Cl.
CPC .......... *H04W 52/0235* (2013.01); *H04L 9/40* (2022.05); *H04W 84/12* (2013.01)

(58) Field of Classification Search
CPC .......................... H04W 52/0235; H04W 84/12
See application file for complete search history.

(56) References Cited

U.S. PATENT DOCUMENTS

| 9,179,449 B2* | 11/2015 | Asterjadhi | H04W 28/06 |
| 2008/0186901 A1* | 8/2008 | Itagaki | H04W 92/18 |
| | | | 370/315 |

(Continued)

OTHER PUBLICATIONS

LG Electronics Inc., "EHT Power Saving considering multi-link", doc.: IEEE 802.11-19/1510r3, Jan. 2020, 17 pages.

(Continued)

*Primary Examiner* — Mohammad S Anwar
(74) *Attorney, Agent, or Firm* — LEE, HONG, DEGERMAN, KANG & WAIMEY

(57) ABSTRACT

According to various embodiments, a multi-link device (MLD) may transmit, to an access point (AP), a request frame for activating a power saving mechanism (PSM). The multi-link device may receive a response frame for activating the PSM. The multi-link device may activate the PSM in at least one of a first link or the second link on the basis of the response frame.

16 Claims, 38 Drawing Sheets

(56) References Cited

U.S. PATENT DOCUMENTS

2018/0176918 A1   6/2018   Hedayat
2019/0037489 A1   1/2019   Wang et al.

OTHER PUBLICATIONS

NXP, "Multi-Link Power Save", doc.: IEEE 802.11-19/1617r1, Dec. 2019, 10 pages.
Intel, "Multi-link power save operation", doc.: IEEE 802.11-19/1544r0, Sep. 2019 18 pages.
PCT International Application No. PCT/KR2021/000316, International Search Report dated Apr. 5, 2021, 4 pages.

\* cited by examiner

FIG. 1
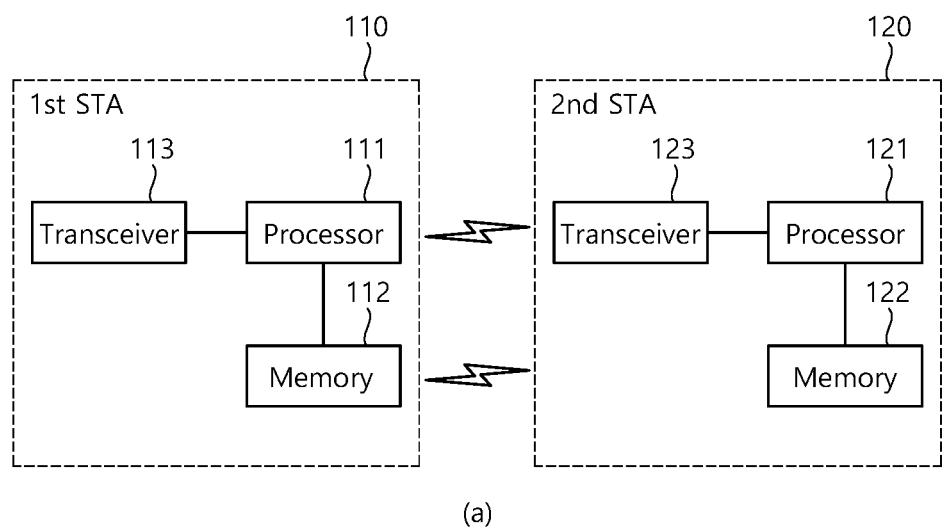
(a)
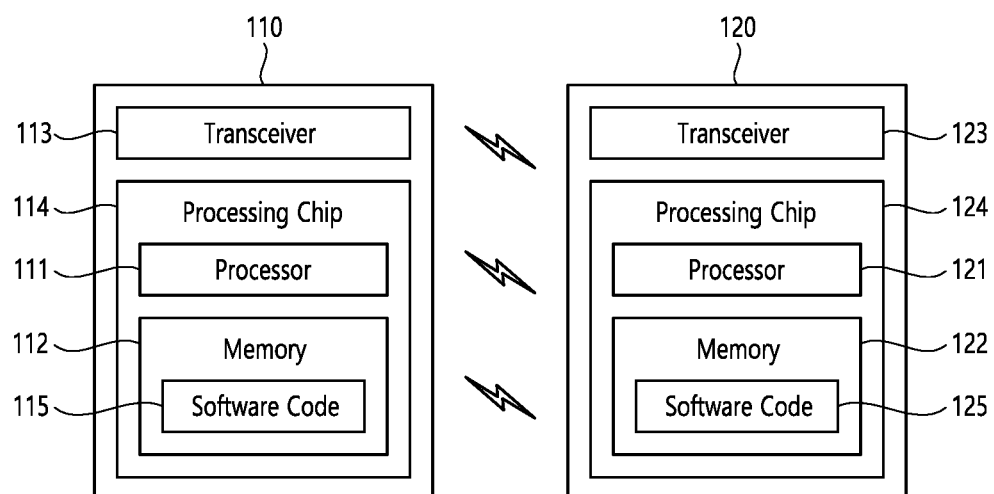
(b)

FIG. 2
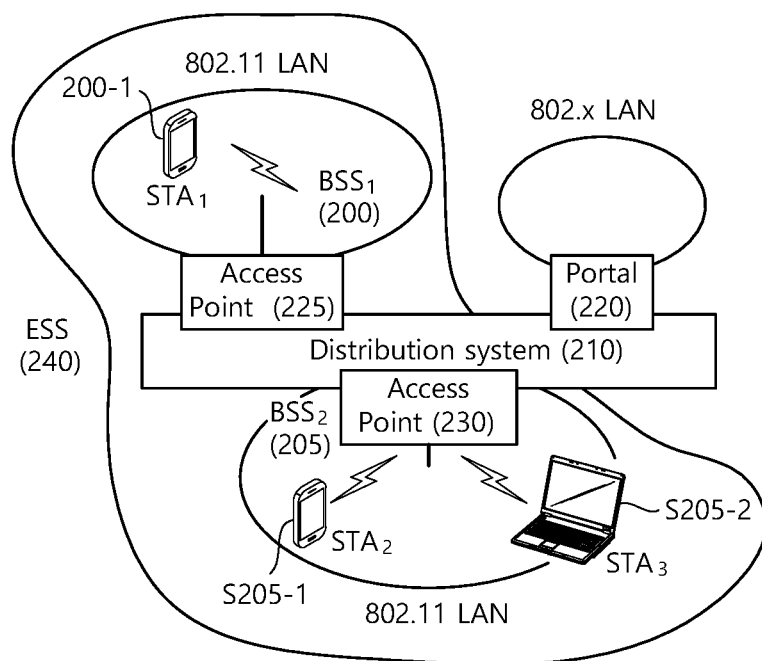
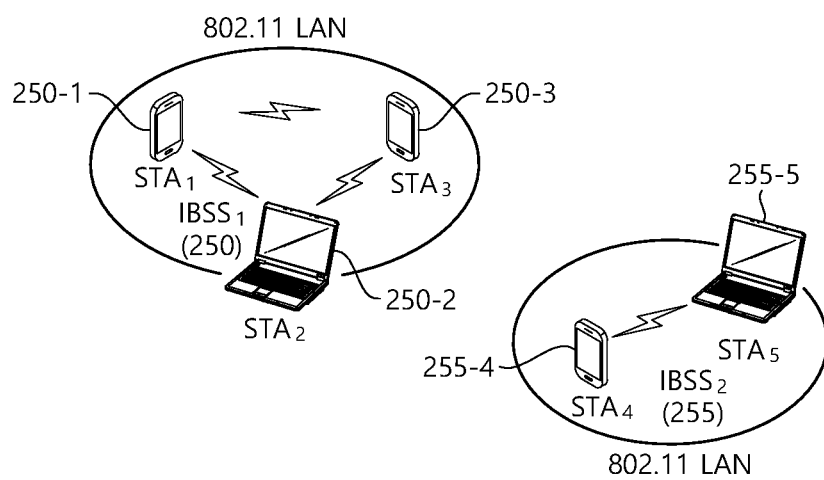

FIG. 28

| Link identifier | non-STR PSM mode | Duration TXOP | UL TX/DL RX support | UL TX support | DL RX support | STR capability |

2810

2800

TECHNIQUE FOR PERFORMING MULTI-LINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2021/000316, filed on Jan. 11, 2021, which claims the benefit of earlier filing date and right of priority to Korean Application Nos. 10-2020-0003393, filed on Jan. 9, 2020, 10-2020-0003872, filed on Jan. 10, 2020, and 10-2020-0061071, filed on May 21, 2020, the contents of which are all incorporated by reference herein in their entireties.

BACKGROUND

Field of the Disclosure

The present specification relates to a technique for performing multi-link communication in a wireless LAN system, and more particularly, to a method for activating Power Saving Mechanism (PSM) in multi-link communication, and an apparatus supporting the same.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

In the EHT standard, in order to support high throughput and high data rate, a wide bandwidth (for example, 160/320 MHz), 16 streams, and/or multi-link (or multi-band) operation may be used.

In the EHT standard, a power reduction technique for reducing power consumption of a multi-link device (MLD) may be applied/used in a power management. An MLD in which simultaneous transmission and reception (STR) is not supported may activate a power saving mechanism (PSM) (that is, non-STR PSM).

As such, when the non-AP MLD uses the power save mode, a technical feature for signaling this may be required. Specifically, below, a technical feature for activating a non-STR PSM for a non-AP MLD that does not support STR capability to reduce power may be described.

Technical Solutions

According to various embodiments, a multi-link device (MLD) including a first station (STA) and a second STA may perform the steps of transmitting a request frame for activating a power saving mechanism (PSM) to an access point (AP) through a first link in which the first STA operates, wherein the request frame includes first information on PSM activation, and wherein the request frame further includes second information on a first identifier (ID) of the first link and a second ID of a second link in which the second STA operates; receiving a response frame for activating the PSM through the first link; and activating the PSM in at least one of the first link and the second link based on the response frame.

Technical Effects

According to various embodiments, the multi-link device may activate non-STR PSM in at least one link among multi-links to avoid collision between links. When the non-STR PSM is activated in at least one link, collisions can be avoided and power consumption can be reduced.

According to various embodiments, the multi-link device may request the AP (or AP MLD) to activate the non-STR PSM. In addition, the multi-link device may transmit, to the AP, link information for activating the non-STR PSM. Accordingly, the multi-link device has the effect of determining whether to activate the non-STR PSM according to the link condition.

Accordingly, the multi-link device may not only receive a non-STR PSM activation instruction from the AP, but may also request the AP to activate the non-STR PSM.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 28 shows another example of the PSM control field.

DETAILED DESCRIPTION

Figure 3:
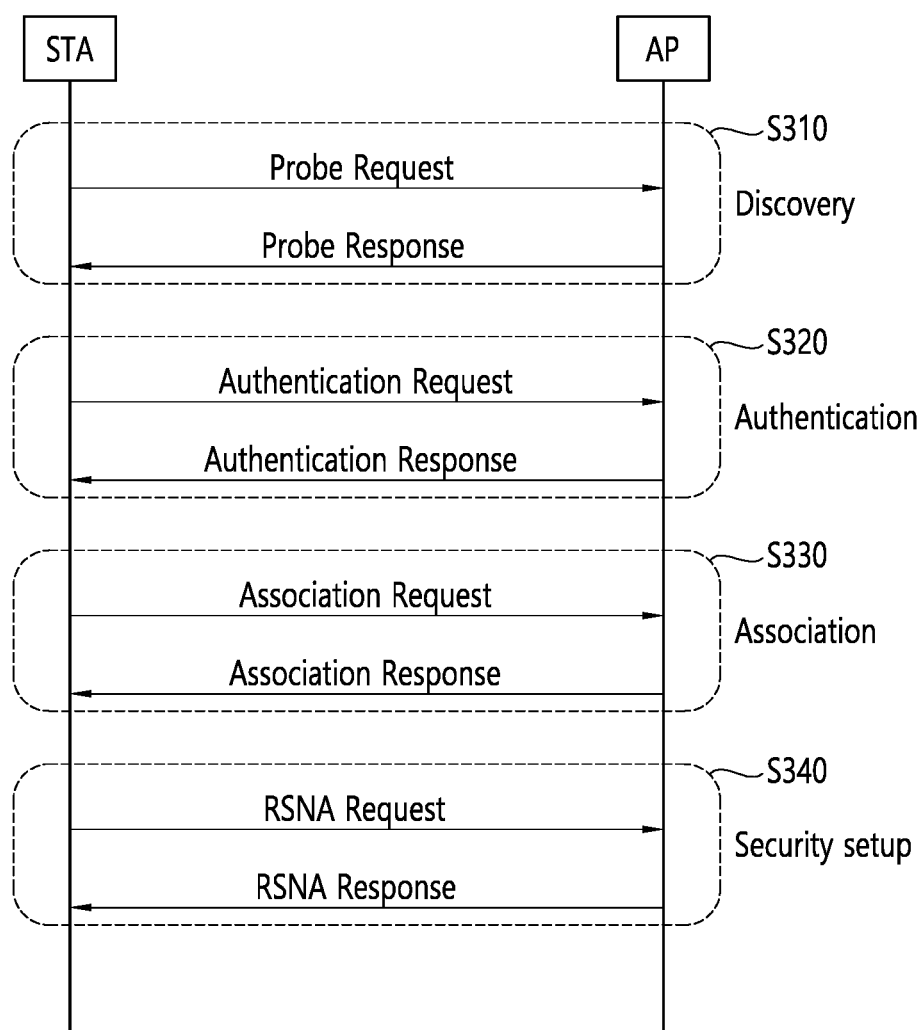
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power-saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
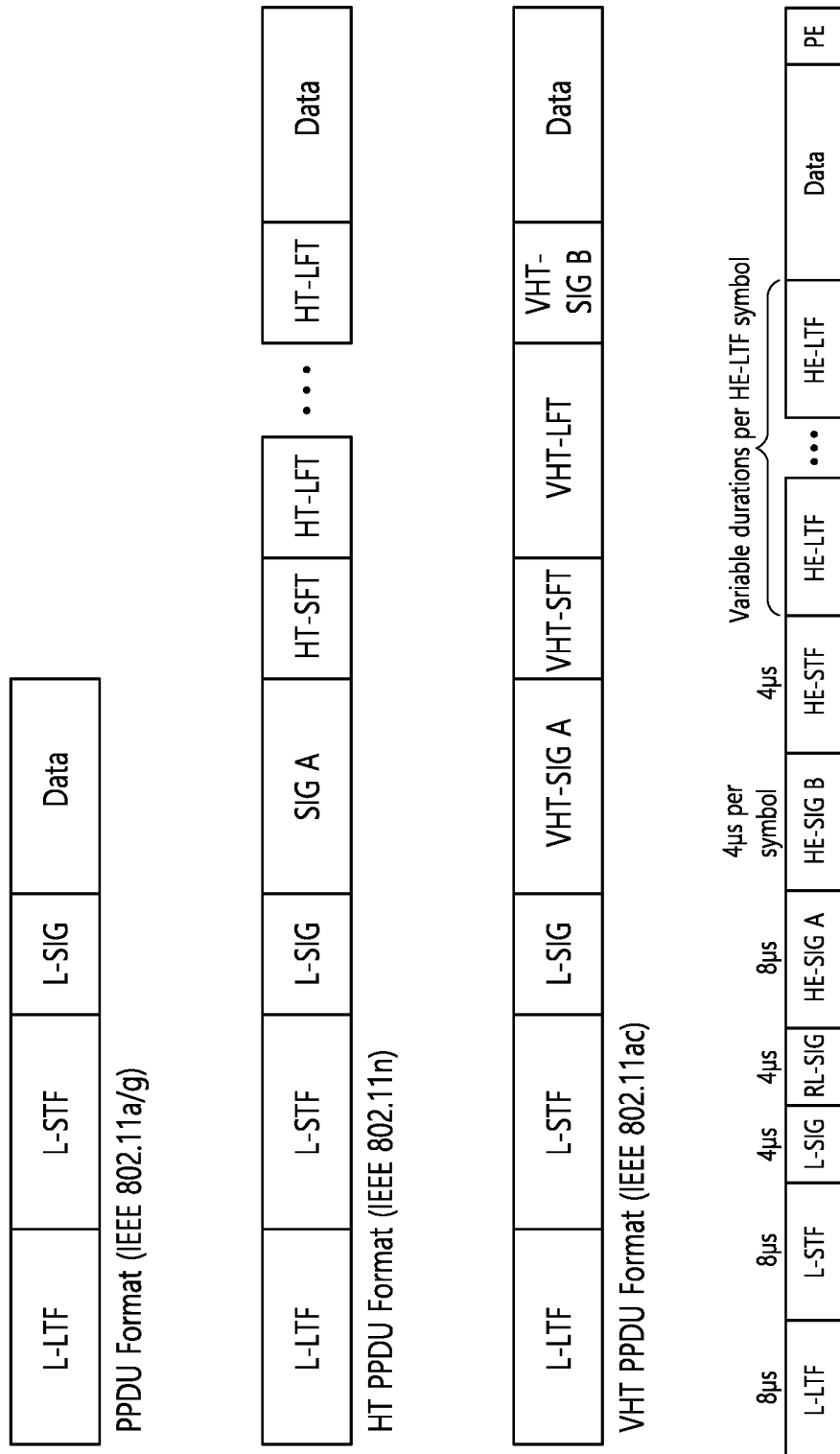
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
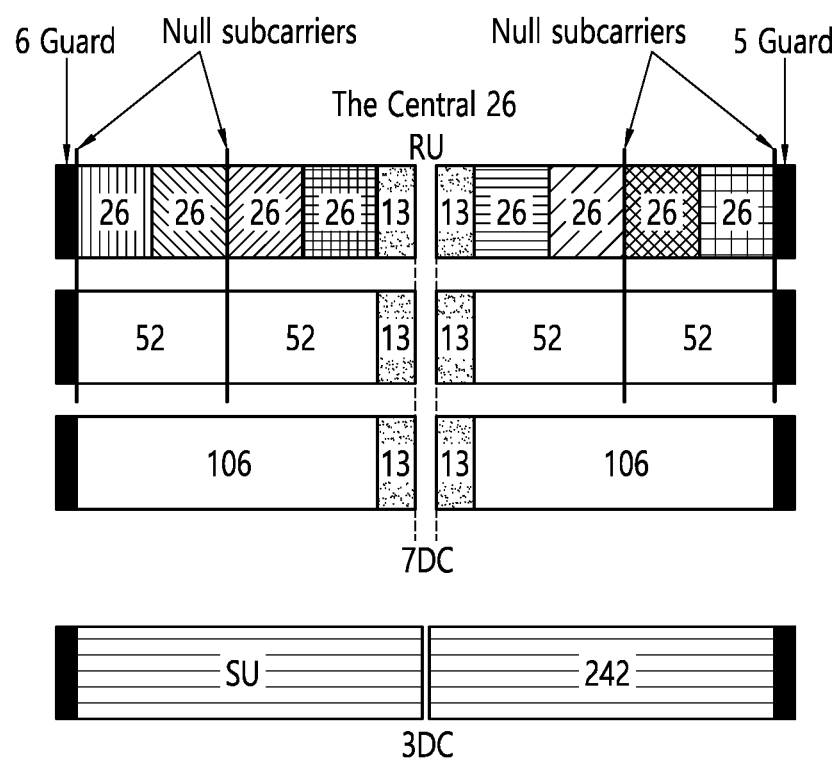
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
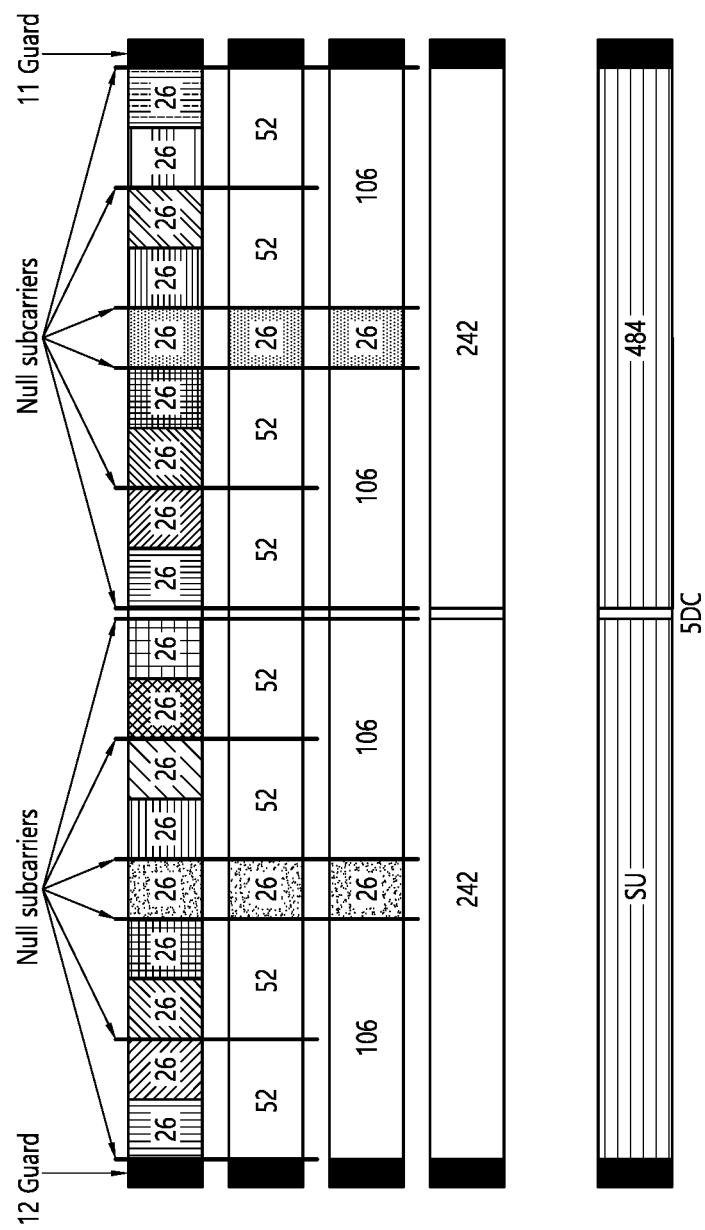
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
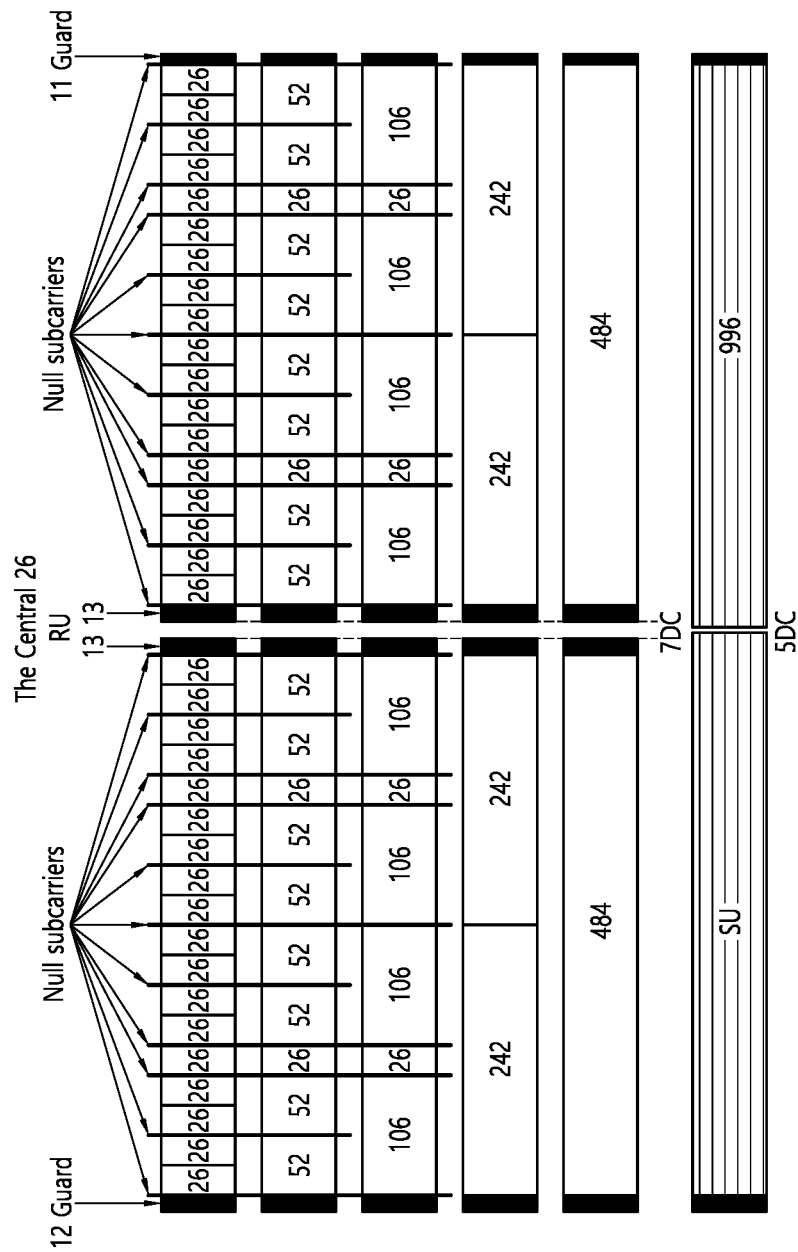
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
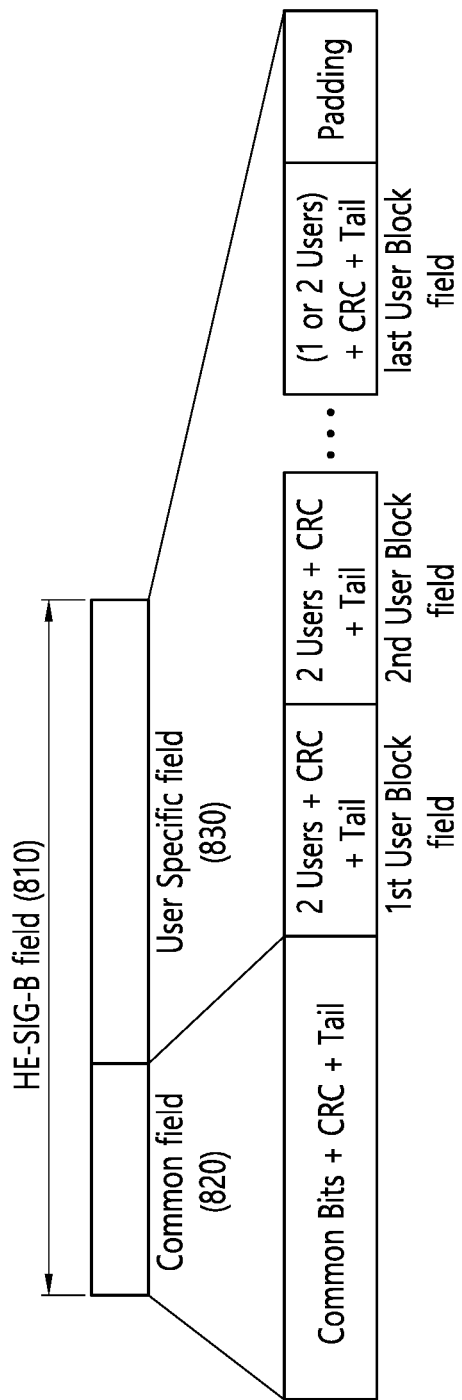
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
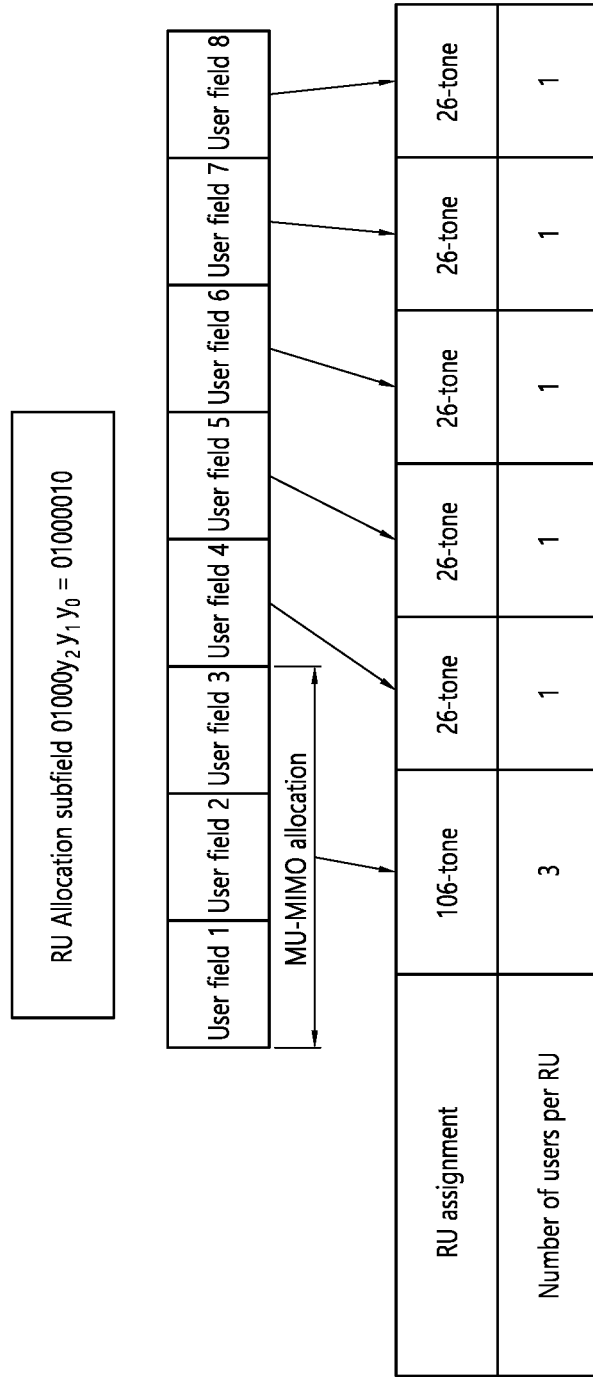
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beam-forming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
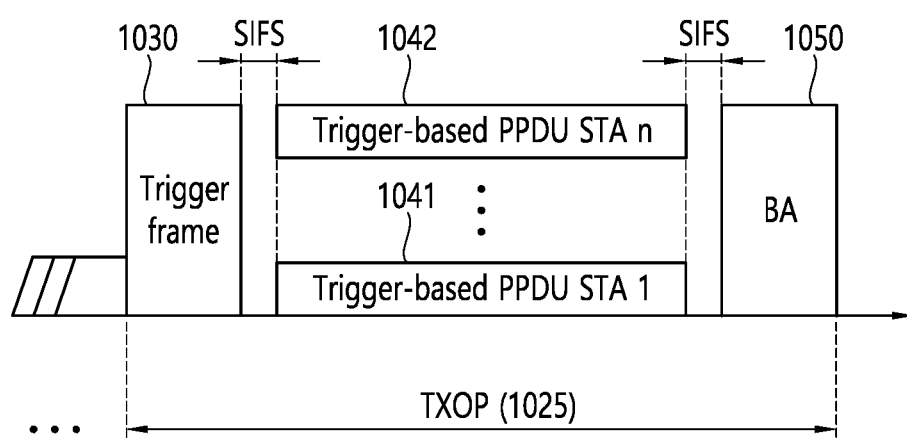
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
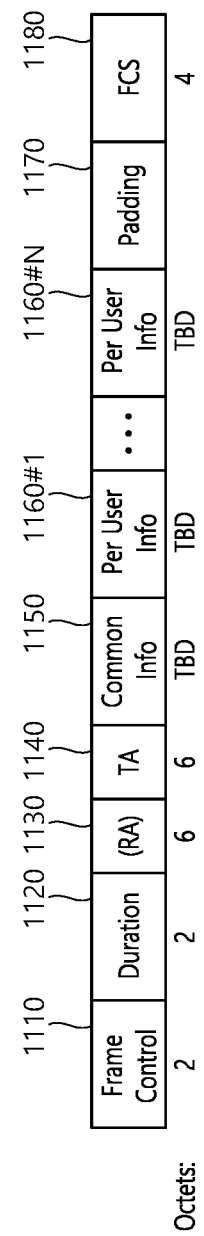
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
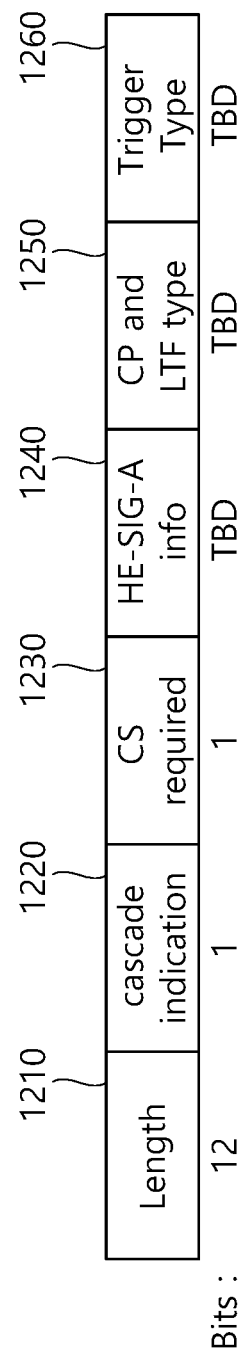
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
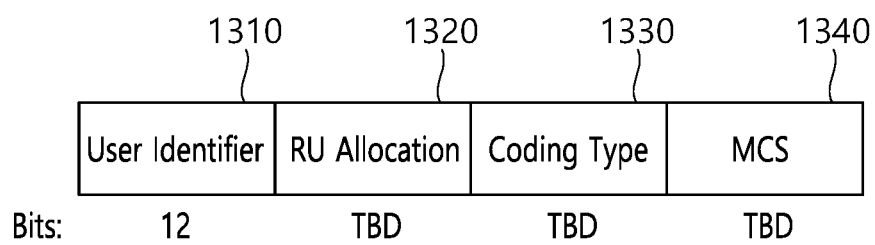
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
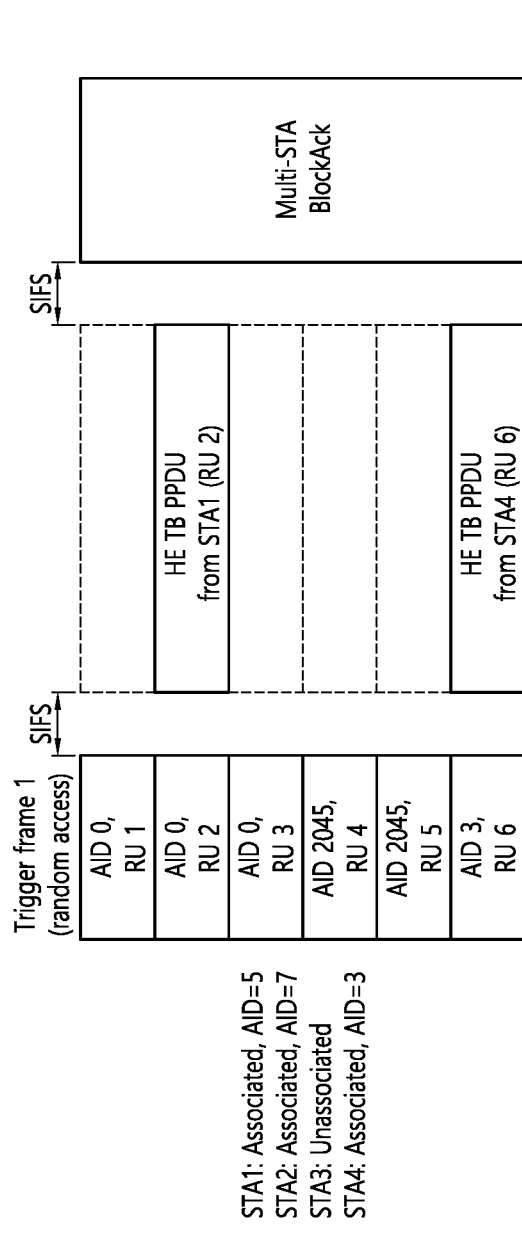
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
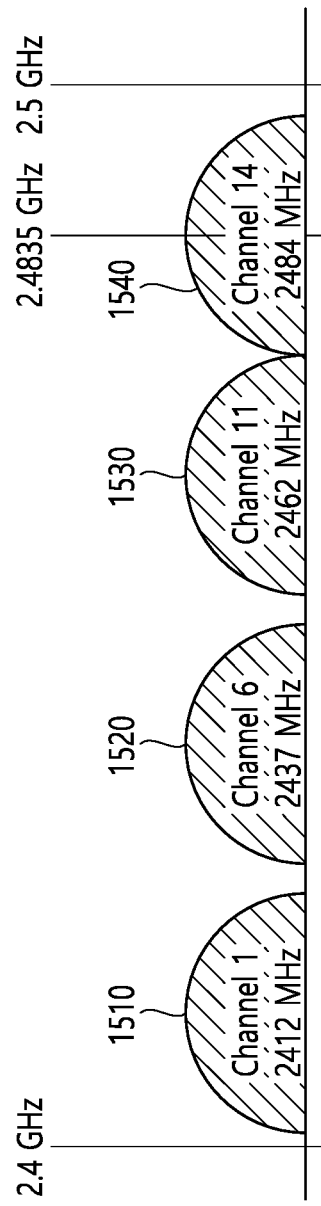
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
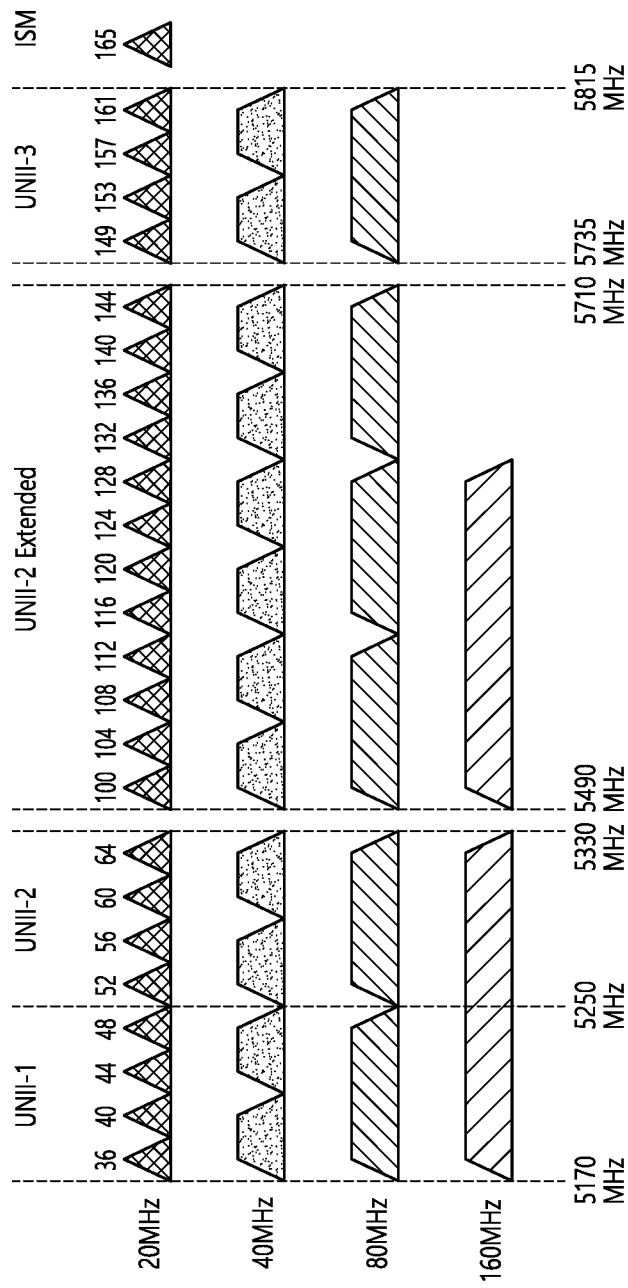
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
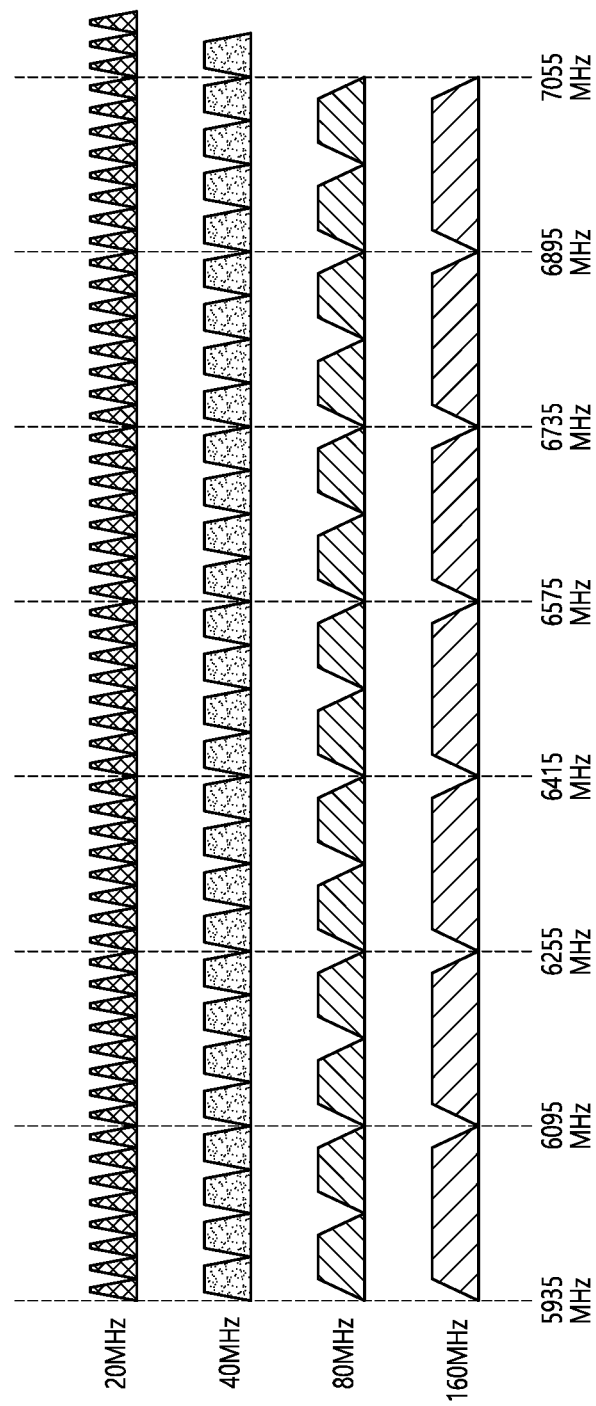
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0  | 26 | 26 | 26 | 26 | 26 | 26 | 26 | 26 | 26 | 1 |
| 1  | 26 | 26 | 26 | 26 | 26 | 26 | 26 | 52 |    | 1 |
| 2  | 26 | 26 | 26 | 26 | 26 | 52 |    | 26 | 26 | 1 |
| 3  | 26 | 26 | 26 | 26 | 26 | 52 |    | 52 |    | 1 |
| 4  | 26 | 26 |    | 52 | 26 | 26 | 26 | 26 | 26 | 1 |
| 5  | 26 | 26 |    | 52 | 26 | 26 | 26 | 52 |    | 1 |
| 6  | 26 | 26 |    | 52 | 26 | 52 |    | 26 | 26 | 1 |
| 7  | 26 | 26 |    | 52 | 26 | 52 |    | 52 |    | 1 |
| 8  |    | 52 | 26 | 26 | 26 | 26 | 26 | 26 | 26 | 1 |
| 9  |    | 52 | 26 | 26 | 26 | 26 | 26 | 52 |    | 1 |
| 10 |    | 52 | 26 | 26 | 26 | 52 |    | 26 | 26 | 1 |
| 11 |    | 52 | 26 | 26 | 26 | 52 |    | 52 |    | 1 |
| 12 |    | 52 |    | 52 | 26 | 26 | 26 | 26 | 26 | 1 |
| 13 |    | 52 |    | 52 | 26 | 26 | 26 | 52 |    | 1 |
| 14 |    | 52 |    | 52 | 26 | 52 |    | 26 | 26 | 1 |
| 15 |    | 52 |    | 52 | 26 | 52 |    | 52 |    | 1 |
| 16 | 26 | 26 | 26 | 26 | 26 |    | 106 |   |    | 1 |
| 17 | 26 | 26 |    | 52 | 26 |    | 106 |   |    | 1 |
| 18 |    | 52 | 26 | 26 | 26 |    | 106 |   |    | 1 |
| 19 |    | 52 |    | 52 | 26 |    | 106 |   |    | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |    | 106 |   |   | 26 | 26 | 26 | 26 | 26 | 1 |
| 21 |    | 106 |   |   | 26 | 26 | 26 | 52 |    | 1 |
| 22 |    | 106 |   |   | 26 | 52 |    | 26 | 26 | 1 |
| 23 |    | 106 |   |   | 26 | 52 |    | 52 |    | 1 |
| 24 | 52 |    | 52 |   | —  | 52 |    | 52 |    | 1 |
| 25 | 242-tone RU empty (with zero users) | | | | | | | | | 1 |
| 26 |    | 106 |   |   | 26 |    | 106 |   |    | 1 |
| 27-34 |  |  |   |   | 242 |   |     |   |    | 8 |
| 35-42 |  |  |   |   | 484 |   |     |   |    | 8 |
| 43-50 |  |  |   |   | 996 |   |     |   |    | 8 |
| 51-58 |  |  |   |   | 2*996 |  |    |   |    | 8 |
| 59 | 26 | 26 | 26 | 26 | 26 |    | 52 + 26 |   | 26 | 1 |
| 60 | 26 |    | 26 + 52 |   | 26 | 26 | 26 | 26 | 26 | 1 |
| 61 | 26 |    | 26 + 52 |   | 26 | 26 | 26 | 52 |    | 1 |
| 62 | 26 |    | 26 + 52 |   | 26 | 52 |    | 26 | 26 | 1 |
| 63 | 26 | 26 |    | 52 | 26 |    | 52 + 26 |   | 26 | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 64 | 26 | | 26 + 52 | | 26 | | 52 + 26 | | 26 | 1 |
| 65 | 26 | | 26 + 52 | | 26 | | 52 | | 52 | 1 |

TABLE 7

| | | | | | | | | | | |
|---|---|---|---|---|---|---|---|---|---|---|
| 66 | 52 | | 26 | 26 | 26 | | 52 + 26 | | 26 | 1 |
| 67 | 52 | | 52 | | 26 | | 52 + 26 | | 26 | 1 |
| 68 | 52 | | 52 + 26 | | | | 52 | | 52 | 1 |
| 69 | 26 | 26 | 26 | 26 | | | 26 + 106 | | | 1 |
| 70 | 26 | | 26 + 52 | | 26 | | 106 | | | 1 |
| 71 | 26 | 26 | 52 | | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | 52 | | | | 26 + 106 | | | 1 |
| 75 | | | 106 + 26 | | | 26 | 26 | 26 | 26 | 1 |
| 76 | | | 106 + 26 | | | 26 | 26 | | 52 | 1 |
| 77 | | | 106 + 26 | | | 52 | | 26 | 26 | 1 |
| 78 | | | 106 | | 26 | | 52 + 26 | | 26 | 1 |
| 79 | | | 106 + 26 | | | | 52 + 26 | | 26 | 1 |
| 80 | | | 106 + 26 | | | | 52 | | 52 | 1 |
| 81 | | | 106 + 26 | | | | 106 | | | 1 |
| 82 | | | 106 | | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2) \quad \text{<Equation 6>}$$

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248:8:248) = \{M,-1,-M,0,M,-1,M\}*(1+j)/\text{sqrt}(2)$$

$$\text{EHT-STF}(-248) = 0$$

$$\text{EHT-STF}(248) = 0 \qquad <\text{Equation 8}>$$

The EHT-STF for the 80 MHz PPDU may be configured based on the following equation.

$$\text{EHT-STF}(-504:8:504) = \{M,-1,M,-1,-M,-1,M,0,-M,1,M,1,-M,1,-M\}*(1+j)/\text{sqrt}(2) \qquad <\text{Equation 9}>$$

The EHT-STF for the 160 MHz PPDU may be configured based on the following equation.

$$\text{EHT-STF}(-1016:16:1016) = \{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$\text{EHT-STF}(-8) = 0, \text{EHT-STF}(8) = 0,$$

$$\text{EHT-STF}(-1016) = 0, \text{EHT-STF}(1016) = 0 \qquad <\text{Equation 10}>$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504) = \{-M,1,-M,1,M,1,-M,0,-M,1,M,1,-M,1,-M\}*(1+j)/\text{sqrt}(2)$$

$$\text{EHT-STF}(-504) = 0,$$

$$\text{EHT-STF}(504) = 0$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
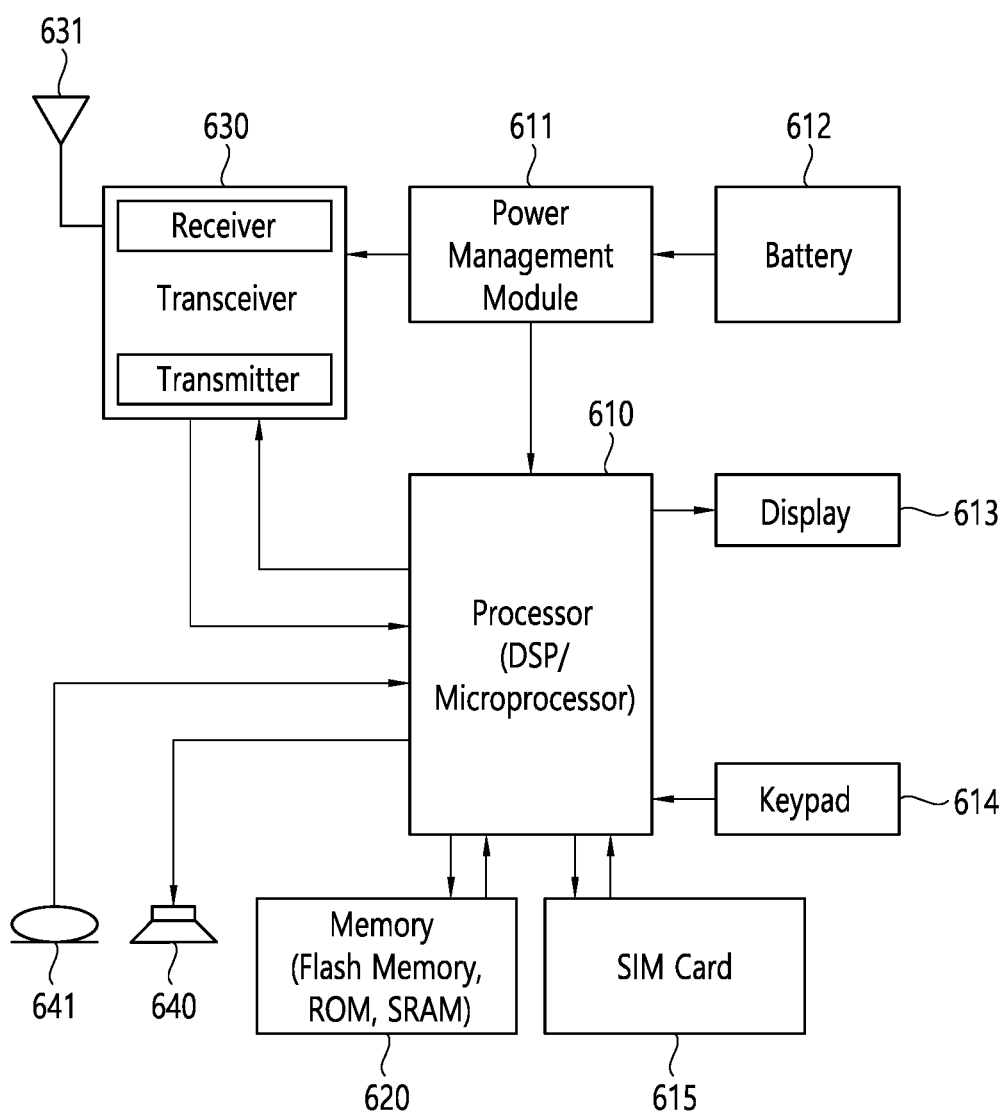
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
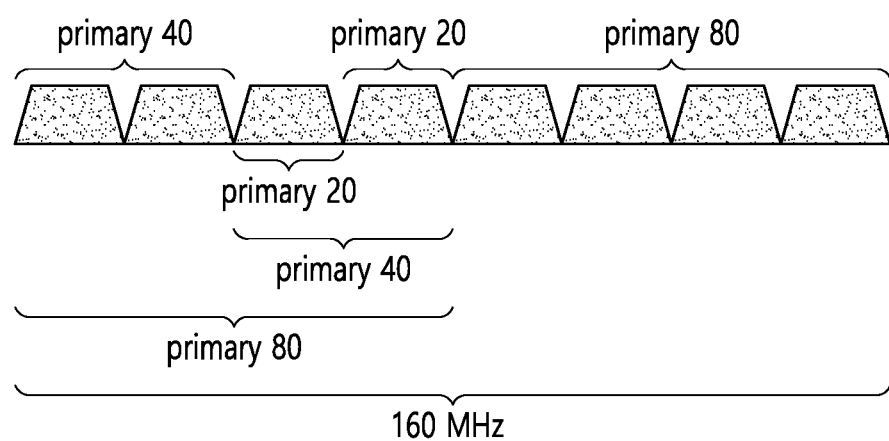
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

MLD and STR Capability

The 802.11be standard (hereinafter, the EHT standard) may support a multi-link. Here, the multi-link may include multiple bands. That is, the multi-link may mean links included in several frequency bands, or may mean a plurality of links included in one frequency band.

The EHT standard may support Simultaneous TX/RX (STR) Channel access according to Link capability in a multi-link support environment. A device supporting a multi-link may be defined as a Non-AP/AP Multi-Link Device (MLD). STR Capability may mean that data (or signals) can be transmitted/received simultaneously in multiple links. That is, an MLD supporting STR capability (hereinafter, STR MLD) may receive data through one link when data transmission occurs on another link.

On the other hand, MLDs that do not support STR capability (hereinafter, non-STR MLDs) cannot simultaneously transmit and receive data (or signals) because data collision may occur due to interference. For example, when a non-STR MLD receives data (or a signal) from one link, it does not attempt transmission to another link to avoid interference. If data (or signal) transmission and reception occur simultaneously in both links, data (or signal) collision may occur.

In other words, the STR MLD may simultaneously perform signal transmission and signal reception in a multi-link, respectively. Non-STR MLD cannot simultaneously transmit and receive signals in a multi-link. While transmitting a signal in the first link among a multi-link, a STA that does not support the STR operation cannot receive a signal in a link different from the first link, but could transmit a signal. In addition, while receiving a signal in the first link among the multi-link, a STA that does not support the STR operation cannot transmit a signal in a link different from the first link, but could receive a signal.

Hereinafter, examples in which collision may occur in the non-STR MLD may be described with reference to FIGS. 21 and 22.

Figure 21:
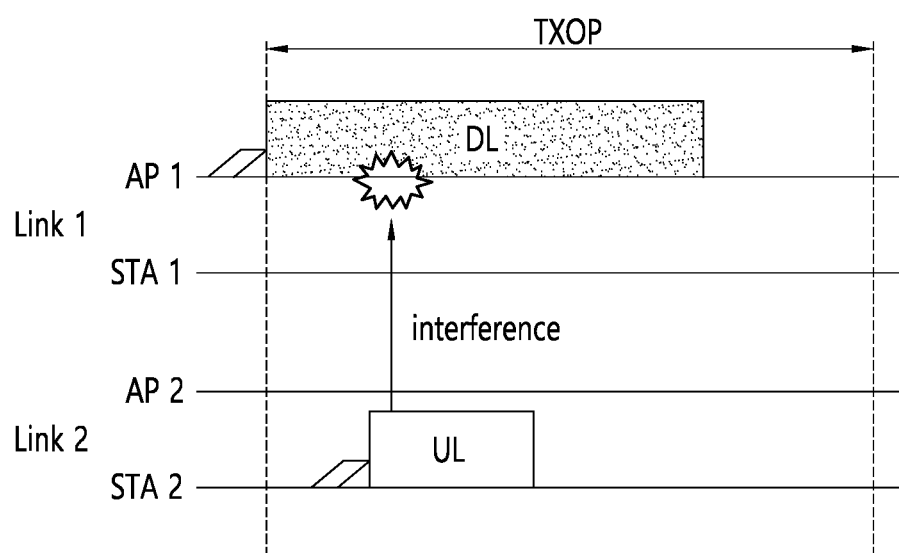
FIG. 21 shows an example in which a collision may occur in a non-STR MLD.

FIG. 21 shows an example in which a collision may occur in a non-STR MLD.

Referring to FIG. 21, the AP MLD may include AP 1 operating in a first link and AP 2 operating in a second link. The non-AP MLD may include STA 1 operating in the first link and STA 2 operating in the second link. At least one of an AP MLD and a non-AP MLD may not support STR capability. The AP MLD may transmit a DL signal through AP 1. When the non-AP MLD transmits a UL signal through STA 2 while the non-AP MLD is receiving the DL signal through STA 1, a collision may occur.

Figure 22:
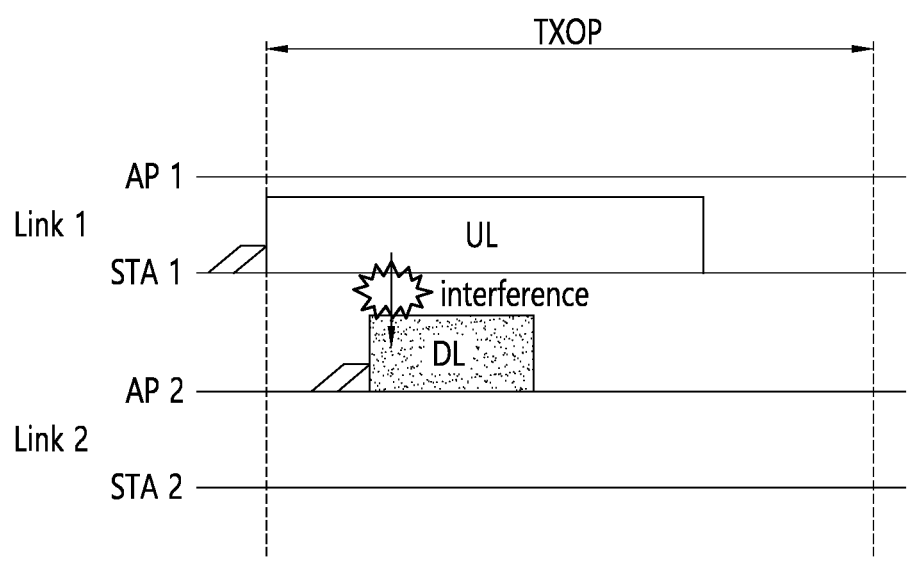
FIG. 22 shows another example in which a collision may occur in a non-STR MLD.

FIG. 22 shows another example in which a collision may occur in a non-STR MLD.

Referring to FIG. 22, an AP MLD and a non-AP MLD may correspond to the AP MLD and the non-AP MLD of FIG. 21, respectively. The non-AP MLD may transmit a UL signal through STA 1. When the AP MLD transmits the DL signal through AP 2, while transmitting the UL signal, a collision may occur.

Referring to FIGS. 21 and 22, when either one of the AP MLD or the non-AP MLD does not support STR capability, there may be restrictions on TX/RX operation. Due to the restrictions of the non-STR MLD operation, a specific section in which a link is not used (i.e. a section in which neither TX/RX occurs) may occur. A specific section in which the link is not used may cause unnecessary power consumption in the non-AP MLD.

Therefore, in the following specification, a power reduction method in consideration of the characteristics of a non-STR MLD that does not support simultaneous transmission/reception may be proposed.

Specifically, when the MLD supports STR Capability in an environment where AP Multi-Link Device (MLD) and Non-AP MLD are connected by a plurality of links (or multi-links), transmission/reception of data (or signal) may occur simultaneously within the same TXOP. However, when any one of AP MLD and non-AP MLD is a non-STR device, if data (or signal) is simultaneously transmitted/received within the same TXOP, data (or signal) may be corrupted by interference. Accordingly, a power reduction technique for non-AP MLDs in consideration of the characteristics of such non-STR MLDs may be proposed. Hereinafter, a specific signaling technique for the power reduction technique may be proposed.

AP MLD and Non-AP MLD

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

According to an embodiment, in the EHT standard (that is, 802.11be), a multi-link may be divided into a Primary/Secondary link to reduce power consumption. APs supporting a multi-link can be managed by designating each link as a primary link or a secondary link. The AP can designate one or more links among several links as the Primary Link. Links other than primary links can operate as secondary links.

According to an embodiment, the primary link may mean a link that performs all functions of the link. In addition, the secondary link may mean a link that performs a limited function (for example, data frame exchange) for power-saving.

According to an embodiment, in the EHT standard, a multi-link may be divided into a general/power-saving link. The above-described primary link may correspond to a general link. In other words, the above-described primary link may be related to a general link. In addition, the above-described secondary link may correspond to a power-saving link. In other words, the above-described secondary link may be related to a power-saving link.

For example, the primary link may be used not only for frame exchange for synchronization but also for non-data frame exchange (that is, Control/Management frame exchange). The secondary link can only be used for data frame exchange.

Therefore, the STA can listen only to the primary link for receiving the Beacon and/or Control/Management frame during the idle time (or period). In other words, the STA may operate only in the primary link for receiving the Beacon and/or Control/Management frame during the idle time (or period). Therefore, a non-AP Multi-Link Device (MLD) must be connected to at least one primary link.

In the following specification, MLD may refer to a multi-link device. The MLD has one or more connected STAs and one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control at least one STA. For example, at least one STA may be independently configured and operated. At least one STA may include a processor and a transceiver, respectively. For example, at least one STA may operate independently regardless of the processor of the MLD.

In the following specification, for the convenience of description, it is described that the MLD (or the processor of the MLD) controls at least one STA, but is not limited thereto. As described above, at least one STA may transmit/receive a signal independently regardless of the MLD.

An AP MLD and a non-AP MLD may be connected by a plurality of links. Hereinafter, for the convenience of description, technical features of the AP MLD and the non-AP MLD may be described through the structures of the two links, which are the most basic structures, of the AP MLD and the non-AP MLD. In addition, by assuming that the non-AP MLD is a non-STR MLD that does not support STR capability, technical features regarding the AP MLD and the non-AP MLD may be described.

Figure 23:
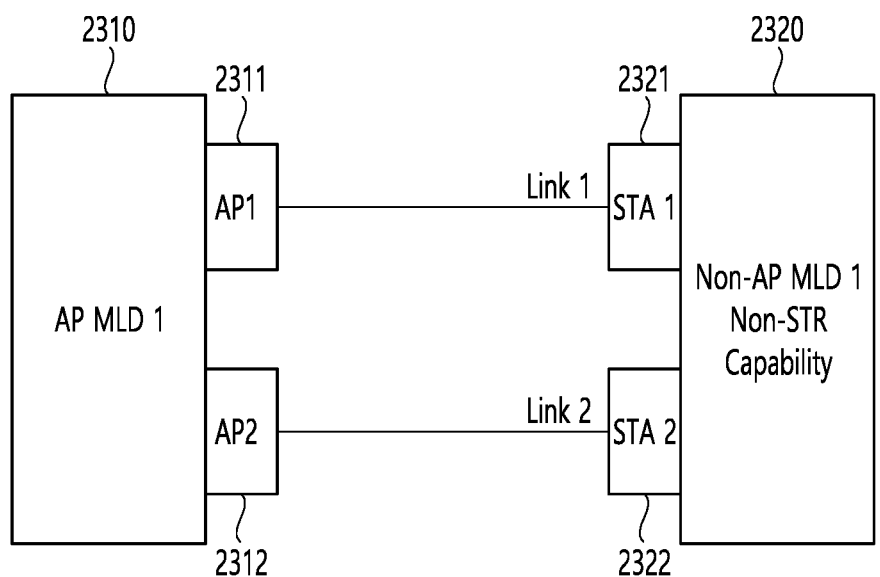
FIG. 23 shows the basic structures of an AP MLD and a non-AP MLD.

FIG. 23 shows the basic structures of an AP MLD and a non-AP MLD.

Referring to FIG. 23, the AP MLD 2310 may include AP 1 2311 and AP 2 2312. The non-AP MLD 2320 may include STA 1 2311 and STA 2 2312. AP 1 2311 and STA 1 2321 may operate in link 1. Also, AP 1 2311 and STA 1 2311 may be connected through link 1. AP 2 2312 and STA 2 2312 may operate in link 2. Also, AP 2 2312 and STA 2 2312 may be connected through link 2. The non-AP MLD 2320 may not support STR Capability. That is, the non-AP MLD 2320 may be a non-STR MLD.

The structures of the AP MLD and the non-AP MLD described in the following specification may correspond to the structures of the AP MLD 2310 and the non-AP MLD 2320 of FIG. 23.

Example of Interference in the Non-AP MLD of the Non-STR Capability

As described above, when the non-AP MLD is a non-STR MLD, when the non-AP MLD receives DL from the AP MLD or transmits UL to the AP MLD through a specific link, it may cause interference to a link other than the specific link. Also, in order to prevent data collision due to the interference, a section in which the link is not used for a specific period may occur. A specific example thereof may be described with reference to FIGS. 24 and 25.

Figure 24:
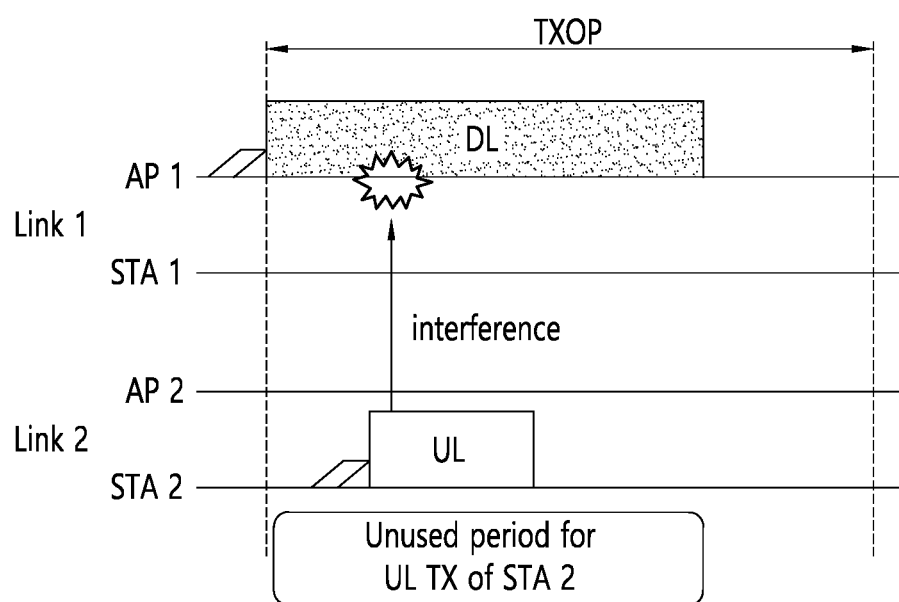
FIG. 24 shows an example of a section in which a link is not used in a non-AP MLD.

FIG. 24 shows an example of a section in which a link is not used in a non-AP MLD.

Referring to FIG. 24, the AP MLD may transmit a DL PPDU through AP 1. When the non-AP MLD transmits the UL PPDU through STA 2, while the DL PPDU is being received, collision (or interference) may occur.

In other words, AP 1 of the AP MLD may transmit a DL PPDU. If STA 2 transmits a UL PPDU, while STA 1 is receiving the DL PPDU, a collision between the DL PPDU and the UL PPDU may occur.

Therefore, when STA 1 of the non-AP MLD receives a DL PPDU through Link 1, STA 2 should not attempt to transmit the UL PPDU to avoid interference until the DL PPDU reception is finished. That is, STA 2 cannot use link 2 for UL PPDU transmission, until the reception of the DL PPDU by STA 1 is finished.

Figure 25:
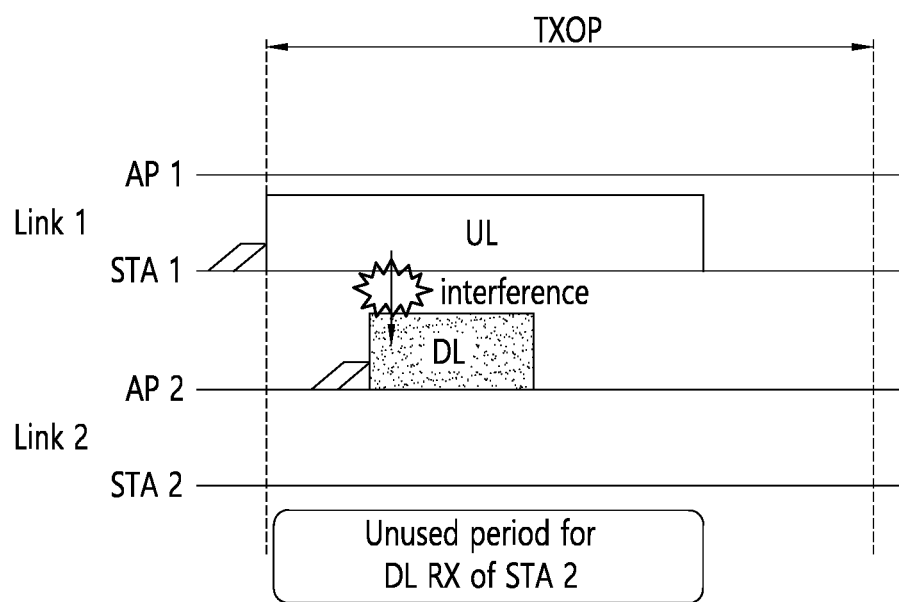
FIG. 25 shows another example of a section in which a link is not used in a non-AP MLD.

FIG. 25 shows another example of a section in which a link is not used in a non-AP MLD.

Referring to FIG. 25, an AP MLD and a non-AP MLD may correspond to the AP MLD and the non-AP MLD of FIG. 21, respectively. The non-AP MLD may transmit a UL PPDU through STA 1. When the AP MLD transmits the DL PPDU through AP 2, while transmitting the UL PPDU, collision (or interference) may occur.

In other words, STA 1 may transmit a UL PPDU through link 1. While STA 1 is transmitting a UL PPDU, when AP 2 transmits a DL PPDU through link 2, collision (or interference) between the UL PPDU and the DL PPDU may occur.

Therefore, when STA 1 of non-AP MLD 1 transmits a UL PPDU through Link 1, AP 2 should not attempt to transmit a DL PPDU to avoid interference until the UL PPDU transmission is finished. That is, STA 2 cannot use Link 2 for DL reception until the UL PPDU of STA 1 ends.

Referring to FIGS. 24 and 25, a specific interval that cannot be used for UL transmission or DL reception may occur due to the characteristics of the non-STR MLD.

Accordingly, in the specific period, based on whether STA 2 transmits/receives data, STA 2 may enter a doze state to reduce power.

Hereinafter, in the case of receiving a DL (or DL PPDU) through the first link and transmitting a UL (or UL PPDU) through the first link, various embodiments in which a STA (for example, STA 2) enters a doze state to reduce power may be described. In addition, the AP MLD and the non-AP MLD may be configured based on the structure shown in FIG. 23.

Power Saving Mechanism when Receiving DL PPDU

Hereinafter, when the non-AP MLD receives DL data (or DL PPDU) from the AP MLD, a power-saving mechanism may be described.

In an environment where an AP MLD (Multi-Link Device) and a Non-AP MLD are connected by multiple links (or a multi-link), if MLD supports STR Capability, data (or signal) transmission/reception can occur simultaneously within the same TXOP. However, if either the AP MLD or the non-AP MLD is a non-STR MLD (or a non-STR device), data (or signal) transmission/reception cannot occur simultaneously in the same TXOP. Considering these characteristics, the MLD device can reduce unnecessary power consumption.

When the non-STR non-AP MLD receives DL data from the AP MLD, an example of operations of the non-AP MLD and the AP MLD may be described with reference to FIG. 26.

Figure 26:
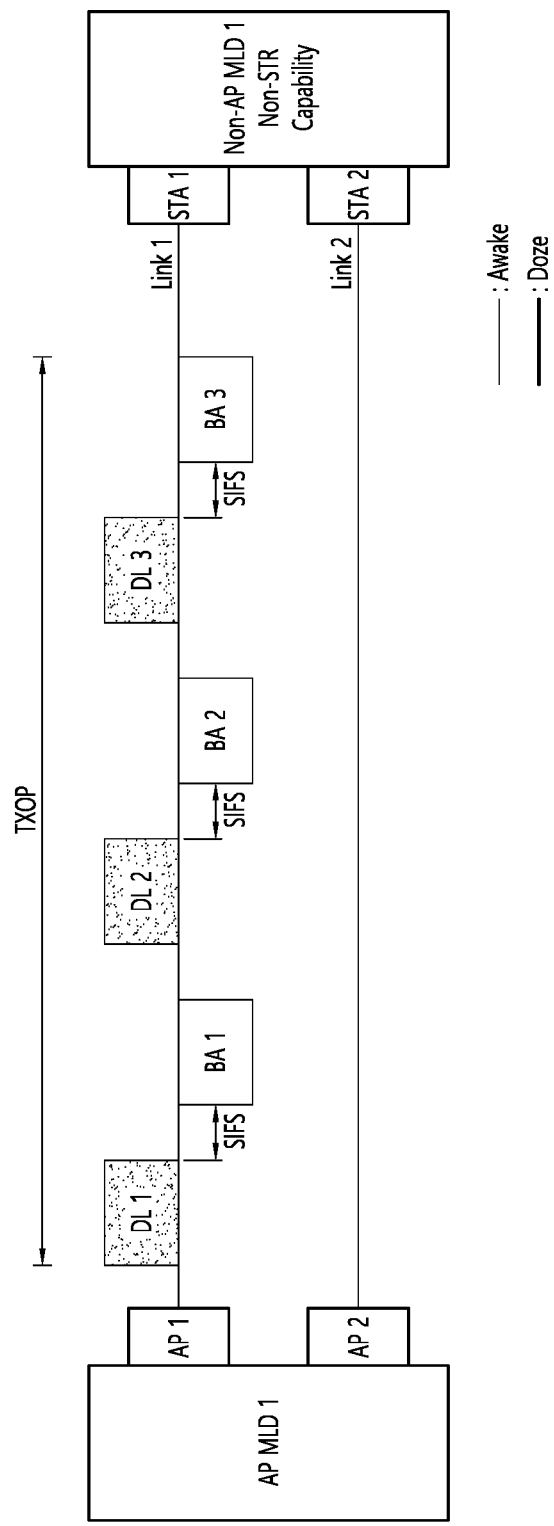
FIG. 26 shows an example of the operation of a non-AP MLD and an AP MLD.

FIG. 26 shows an example of the operation of a non-AP MLD and an AP MLD.

Referring to FIG. 26, non-AP MLD 1 and AP MLD 1 may have the structures of non-AP MLD 1 and AP MLD 1 of FIG. 23. Non-AP MLD 1 may be a non-STR capability device (or a non-STR MLD) that does not support the STR capability.

STA 1 of Non-AP MLD 1 may receive a DL PPDU (or a DL signal) from AP 1 through Link 1. Until the DL PPDU reception is finished, STA 2 cannot transmit a UL PPDU (or UL signal) to avoid interference. STA 2 may only perform DL PPDU reception.

According to an embodiment, DL data transmission for STA 2 of AP 2 may not occur during the same DL TXOP period. In this case, a period in which neither UL data transmission nor DL data reception occurs until DL PPDU transmission in STA 2 is completed. During this period, STA 2 may enter a doze state (or a power-saving state, a sleep state, or an Unavailable state for Other Links) to reduce power.

Although not shown, for example, STA 2 may enter a doze state during the TXOP period. For another example, STA 2 may enter a doze state during DL data (DL 1, DL 2, or DL 3) transmission time.

In the following specification, technical features related to signaling for activating the above-described power save mechanism (hereinafter, PSM) may be described. Specifically, a signaling method for a power save mechanism applicable to an MLD that does not support the STR capability in a wireless LAN system (IEEE 802.11) may be described. PSM may be defined in various ways. PSM may also mean power save mode.

From a power management point of view, a non-AP MLD may apply/use a power reduction technique to reduce STA power consumption. Hereinafter, for the convenience of description, the above-described power saving technique may be referred to as non-STR PSM (i.e. power save mechanism considering non-STR MLD). As such, when the non-AP MLD uses the power save mode, a technical feature for signaling this may be required. Specifically, below, a technical feature for activating a non-STR PSM for a non-AP MLD that does not support STR capability to reduce power may be described.

According to one embodiment, basically, the indication (or whether to indicate or not) for the non-STR PSM (i.e. Power save mechanism considering non-STR MLD) may be determined based on the presence or absence of a power management-related element (for example, EHT Capability element, EHT Operation element, EHT Extended capabilities element, etc.).

According to an embodiment, an indication (or whether to indicate or not) for a non-STR PSM (i.e. power save mechanism considering non-STR MLD) may be explicitly indicated. Hereinafter, a field for transmitting information about non-STR PSM Support and/or Mode may be proposed.

Field Configuration for Non-STR PSM Support & Mode

Non-STR PSM Support (or Non-STR PSM Support field): A field for indicating the capability of whether an AP MLD or a non-AP MLD supports non-STR PSM For example, if the value of Non-STR PSM Support is a first value (for example, 1), it may mean that the non-STR PSM mode is supported. As another example, if the value of Non-STR PSM Support is a second value (for example, 0), it may mean that the non-STR PSM mode is not supported.

Non-STR PSM Support (or Non-STR PSM Support field) may be defined as a sub-field such as 'non-STR PS Support' in the EHT MAC Capabilities information field.

Non-STR PSM mode (or Non-STR PSM mode field): The Non-STR PSM mode may include information on whether to enable the Non-STR PSM supported by itself.

For example, when the element (that is, Non-STR PSM mode) has (or is assigned) a non-STR PSM capability value, it may mean that non-STR PSM capability is supported. For example, when the value of the Non-STR PSM mode is a first value (for example, 1), it may mean that the non-STR PSM is activated and this function is operated. Conversely, when the value of the Non-STR PSM mode is a second value (for example, 0), it may mean that the current non-STR PSM function is deactivated.

According to an embodiment, the information on the non-STR PSM may be indicated semi-statically or dynamically.

For example, when the information on the non-STR PSM is indicated semi-statically, the Non-STR PSM mode (or the Non-STR PSM mode field) may be included in the EHT capability or EHT operation element.

For another example, when the information on the non-STR PSM is dynamically indicated, the Non-STR PSM mode (or the Non-STR PSM mode field) may be piggybacked and included in the control frame or data frame.

Duration_TXOP (or Duration_TXOP field): Duration_TXOP may be a field indicating length information for maintaining a Doze state when the STA enters Doze by non-STR PSM.

For example, Duration_TXOP may be defined as 1 bit. For example, if the value of Duration_TXOP is the first value (for example, 1), the STA may enter the Doze state during the TXOP period acquired by the other AP. As another example, if the value of Duration_TXOP is the second value (for example, 0), the STA may enter the Doze state only by the length of the DL PPDU transmitted by the other AP.

According to an embodiment, information on Duration_TXOP (or Duration_TXOP field) may be indicated semi-statically or dynamically.

For example, when the Duration_TXOP information is indicated semi-statically, Duration_TXOP (or Duration_TXOP field) may be included in the EHT capability or EHT operation element.

For another example, when the information on the Duration_TXOP is dynamically indicated, the Duration_TXOP (or Duration_TXOP field) may be piggybacked and included in the control frame or the data frame.

UL TX Support (or UL TX Support field): In the non-STR PSM, an operation may be defined separately for a case where a non-AP MLD transmits UL and receives DL.

For example, the non-AP MLD (or AP MLD) may activate the non-STR PSM operation when UL transmission of the non-AP MLD, and activate the non-STR PSM operation when DL reception of non-AP MLD is needed, respectively. If the non-AP MLD operates as a non-STR PSM and the non-AP MLD wants to operate as a non-STR PSM during the UL transmission, the value of UL TX Support may be set to a first value (for example, 1). When the value of UL TX Support is the second value (for example, 0), it may mean that the non-AP MLD does not operate as a non-STR PSM during UL transmission.

According to an embodiment, the information on the UL TX Support may be indicated semi-statically or dynamically.

For example, when the UL TX Support information is indicated semi-statically, UL TX Support (or UL TX Support field) may be included in the EHT capability or EHT operation element.

For another example, when the information on the UL TX Support is dynamically indicated, the UL TX Support (or the UL TX Support field) may be piggybacked and included in a control frame or a data frame.

DL RX Support (or DL RX Support field): In non-STR PSM, an operation may be defined separately for a case in which the non-AP MLD transmits UL and receives DL.

For example, a non-AP MLD (or an AP MLD) may activate the non-STR PSM operation when the UL transmission of the non-AP MLD, and activate the non-STR PSM operation when the DL reception of non-AP MLD is needed, respectively. If the non-AP MLD operates as a non-STR PSM and the non-AP MLD wants to operate as a non-STR PSM upon the DL reception, the value of DL RX Support may be set to the first value (for example, 1). When the value of DL RX Support is the second value (for example, 0), it may mean that the non-AP MLD does not operate as a non-STR PSM upon the DL reception.

According to an embodiment, the information on the DL RX Support may be indicated semi-statically or dynamically.

For example, when the DL RX Support information is indicated semi-statically, DL RX Support (or DL RX Support field) may be included in the EHT capability or EHT operation element.

For another example, when the information on the DL RX Support is dynamically indicated, the DL RX Support (or DL RX Support field) may be piggybacked and included in a control frame or a data frame.

UL TX/DL RX Support (or UL TX/DL RX Support field): For non-STR PSM, when a non-AP MLD wants to operate as non-STR PSM when UL transmission and DL reception are performed, a value of UL TX/DL RX Support (or UL TX/DL RX Support field) may be set to a first value (for example, 1). If the value of TX/DL RX Support is the second value (for example, 0), it may mean that the operation at the time of UL transmission and the operation at the time of DL reception are not activated at the same time.

According to an embodiment, the TX/DL RX Support (or UL TX/DL RX Support field) may be defined together with the above-described UL TX Support and DL RX Support fields.

According to an embodiment, the TX/DL RX Support (or UL TX/DL RX Support field) may be defined as a separate additional field different from the above-described UL TX Support and DL RX Support fields.

According to an embodiment, when the information to be transmitted in the UL TX Support and DL RX Support fields is sufficient, TX/DL RX Support may be omitted.

According to an embodiment, the information on the TX/DL RX Support may be indicated semi-statically or dynamically.

For example, when the information on the TX/DL RX Support is indicated semi-statically, TX/DL RX Support (or TX/DL RX Support field) may be included in the EHT capability or EHT operation element.

As another example, when the information on the TX/DL RX Support is dynamically indicated, the TX/DL RX Support (or the TX/DL RX Support field) may be piggybacked and included in a control frame or a data frame.

In this case, if the aforementioned capability information (for example, capability information on non-STR PSM) is applied to all STAs of a non-AP MLD, the aforementioned capability information may be indicated through the aforementioned information/field.

According to an embodiment, the non-AP MLD (or the AP MLD) may independently activate the non-STR PSM only for some STAs. For example, the non-AP MLD (or the AP MLD) may indicate capability for each STA by using a Link Identifier or a STA Identifier described below. However, if the frame does not include a Link Identifier or STA identifier information, it may mean activating or deactivating the non-STR PSM for all STAs in the non-AP MLD.

Hereinafter, information or a field for indicating capability regarding the non-STR PSM for each STA may be described.

Link Identifier: An identifier that can distinguish each Link. According to an embodiment, the non-AP MLD (for example, STA) may newly define an identifier for each Link. According to an embodiment, the non-AP MLD (for example, STA) may use an existing BSSID, BSS Color, and the like, as an identifier. According to an embodiment, the non-AP MLD (for example, STA) may use channel information on a Link and use it as an identifier.

For example, the new link ID may be configured/defined as '0, 1,'. In other words, the new link ID may be configured/defined as an integer of 0 or more.

For example, channel indication information used in an HT/VHT/HE operation element may be used as channel information. As another example, the channel information may be newly defined in the EHT standard. For example, the link channel information may be expressed as a primary channel number, center frequency, channel width, and the like.

For example, three links may be configured. Each link ID may be configured to 0, 1, or 2. As an example, information on Non-STR PSM capability for each link may be transmitted, such as [Non-STR PSM capability=1, Link ID=0,1].

According to an embodiment, a link for configuring a non-STR PSM may be indicated/transmitted through a bitmap. For example, a link for which a non-STR PSM is to be configured may be set/indicated as 1 in the bitmap. Links on which non-STR PSM will not be set may be set/indicated as 0 in the bitmap. According to an embodiment, whether non-STR PSM is configured may be indicated by a separate field for each link. If the field is omitted, it may mean that it is configured for all links of a non-AP MLD.

STA Identifier: An identifier that can distinguish each STA. According to an embodiment, the non-AP MLD (for example, STA) may newly define an identifier for each STA. According to an embodiment, the non-AP MLD (for example, STA) may use STA ID field information included in the existing MAC Header and use it as an identifier.

For example, the new STA ID may be set/defined as '0, 1,'. In other words, the new STA ID may be set/defined as an integer of 0 or more.

For example, the non-AP MLD may include three STAs. Each STA ID may be set to 0, 1, or 2. As an example, information on Non-STR PSM capability for each STA may be transmitted such as [Non-STR PSM capability=1, STA ID=1,2].

According to an embodiment, the STA to configure the non-STR PSM may be indicated/transmitted through a bitmap. For example, the STA that will configure the non-STR PSM may be set/indicated as 1 in the bitmap. A STA that will not configure a non-STR PSM may be set/indicated as 0 in the bitmap. According to an embodiment, whether non-STR PSM is configured may be indicated by a separate field for each STA. If the field is omitted, it may mean that it is configured for all STAs (or all links) of the non-AP MLD.

According to an embodiment, the inter-link STR capability of non-AP MLD may be changed according to a channel or link environment. Therefore, the non-AP MLD can help the AP associated with the STR capability by informing the AP of this information. That is, in order to inform the AP of this, a field indicating the current STR capability is required. A field indicating whether STR capability is present may be set as follows.

STR capability (or STR capability field): STR capability may indicate whether the current non-AP MLD supports STR capability. In other words, the STR capability may include information on whether the current non-AP MLD supports the STR capability. When the value of the STR capability is the first value (for example, 1), it may mean that the operation is based on the STR capability. When the value of the STR capability is a second value (for example, 0), it may mean that the operation is based on a non-STR capability that does not support the STR capability. That is, in this case, an MLD may have a constraint on simultaneous TX/RX.

Non-STR PSM Mode Control Method

According to an embodiment, each AP/STA may have a non-STR PSM Control field (for example, non-STR PSM mode field) or element for activating the non-STR PSM. For example, when the value of the element is 1, it may mean that the non-STR PSM mode is activated, and when the value of the element is 0, it may mean that the non-STR PSM mode is deactivated.

For example, the PSM Control field or the element may be piggybacked and included in a management frame (e.g. Association Request/Probe request/Beacon/Association response/Probe response, and the like). For example, the PSM Control field or the element may be transmitted in an action frame (e.g. Non-STR PSM announcement frame, and the like) or a new control/data field.

When the information included and piggybacked in the PSM Control field or the element is transmitted, the PSM Control field or information included in the element may be included in data or a QoS null frame, and may be transmitted using the QoS Control field or the HT Control field.

Additionally, the PSM Control field or the element may be transmitted in a separate control frame or an extended control frame (e.g. Non-STR PSM announcement frame, and the like).

Additionally, the PSM Control field or the element may include the above-described Link identifier or STA identifier. Based on the PSM Control field or the element, the non-AP MLD (or the AP MLD) may independently activate or deactivate a power-saving operation for each STA (that is, Link) of the non-AP MLD.

If Link Identifier (or Link identifier field) or STA identifier (or STA identifier field) is not included in the PSM Control field or the element, it may mean activating or deactivating the Non-STR PSM for all STAs in the non-AP MLD.

According to an embodiment, the non-STR PSM may be controlled semi-statically or dynamically.

For example, when the non-STR PSM is semi-statically controlled, whether to activate the non-STR PSM mode may be determined in a link set-up process. At this time, the determined non-STR PSM may be fixedly used. The (re) association may be required to change whether non-STR PSM is activated or not.

For another example, when the non-STR PSM mode is dynamically controlled, whether a STA is activated can be controlled whenever a STA is needed without a separate (re)association.

When the STR capability of the non-AP MLD is determined in units of TXOP (or when determined in units of channel access), an STR capability field may be added to the PSM control field to inform the AP of this information.

For example, when non-AP MLD deactivates non-STR PSM due to STR capability information change, its current STR capability information may be transmitted together with other information included in the PSM control field. Accordingly, the AP MLD (for example, AP) may support the operation for the non-AP MLD according to the STR capability based on the STR capability field (or STR capability information).

As another example, even when the non-AP MLD is changed to non-STR capability, this information may be transmitted to the AP. The AP MLD (for example, AP) may support the operation for the non-AP MLD according to the non-STR capability based on the information.

In other words, the PSM control field may further include an STR capability field. The STR capability field may include STR capability information. The STR capability information may include information on whether STR is supported. The non-AP MLD may transmit an STR capability field (or STR capability information) to the AP MLD. Accordingly, the AP MLD may identify information on whether the non-AP MLD currently supports the STR.

Figure 27:
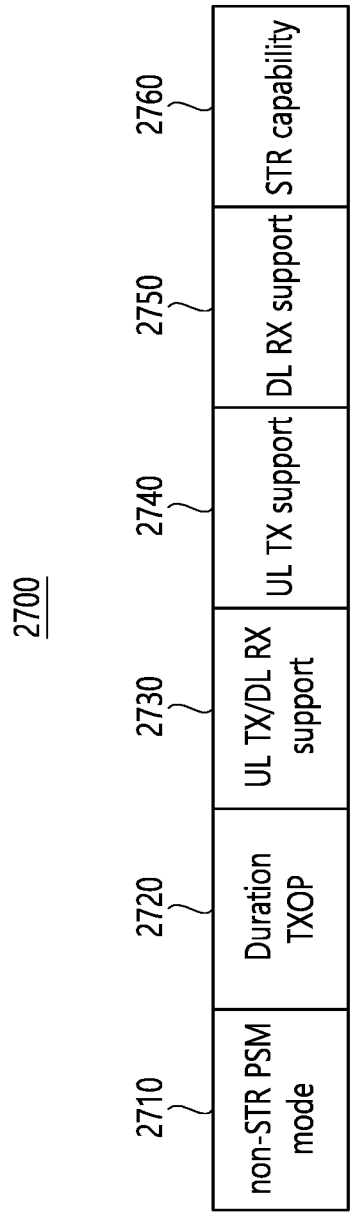
FIG. 27 shows an example of a PSM control field.

FIG. 27 shows an example of a PSM control field.

Referring to FIG. 27, a PSM control field 2700 may be configured to control a non-STR PSM. The PSM control field 2700 may include the above-described field or element. For example, the PSM control field 2700 may include non-STR PSM mode 2710, Duration TXOP 2720, UL TX/DL RX support 2730, UL TX support 2740, DL RX support 2750, and/or STR capability 2760.

For example, the non-AP MLD (for example, STA) may use the PSM control field 2700 to control the non-STR PSM mode.

The PSM control field 2700 may be piggybacked and transmitted via a transmission frame (e.g. management frame, data frame, QoS null frame, and the like), or included in and transmitted via a separate frame (e.g. control frame).

According to an embodiment, when the non-STR PSM mode is semi-statically controlled, information on the PSM control field 2700 may be exchanged in a multi-link setup process (e.g. (re)association process).

According to an embodiment, when the non-STR PSM mode is dynamically controlled, information on the PSM control field 2700 may be always exchanged during the frame exchange process. A field (or information) included in the PSM control field 2700 may be omitted depending on circumstances.

According to an embodiment, the non-AP MLD (or the AP MLD) may perform various settings for the non-STR PSM operation based on the above-described PSM control field 2700.

For example, the non-AP MLD may configure a frame or a control field (for example, PSM control field 2700) within the frame to control the non-STR PSM mode. For example, in the example of the PSM control field 2700 described above, it may be configured as Non-STR PSM mode=1, Duration TXOP=1, ULTX/DL RX Support=0, UL TX Support=1, DL RX Support=0. In other words, the value of the non-STR PSM mode 2710 may be set to 1, the value of Duration TXOP (2720) may be set to 1, the value of UL TX/DL RX support (2730) may be set to 0, the value of UL TX support (2740) may be set to 1, and the value of DL RX support 2750 may be set to 0. The non-AP MLD may transmit the configured PSM control field 2700 to the AP MLD. At this time, if the non-AP MLD activates the non-STR PSM mode, the STR capability 2760 of the PSM control field 2700 may be omitted.

Non-STR PSM may be activated through the PSM control field 2700 set as described above. In addition, through the PSM control field 2700 set as described above, in order to further reduce power consumption, the STA's doze entry period may be set during TXOP. In addition, in the non-STR PSM operation, the STA may operate in the non-STR PSM only when UL TX. In other words, when the STA is DL RX, it does not operate as a non-STR PSM.

As another example, the non-AP MLD may set the PSM control field 2700 to Non-STR PSM mode=0 and STR capability=1 and transmit it. The non-AP MLD may want to deactivate the non-STR PSM and at the same time inform the AP MLD that the link capability of the current non-AP MLD is the STR capability.

According to an embodiment, in the case of a non-AP MLD supporting multi-link, non-STR PSM operation can be controlled only for some links. In this case, if the non-AP MLD transmits the link identifier to be controlled together, the control contents can be applied only to the included link identifier. For example, a link identifier for identifying a link may be one bitmap, and each bit may represent a STA of each non-AP MLD. As another example, the link identifier may be represented by a different field for each link.

FIG. 28 shows another example of the PSM control field.

Referring to FIG. 28, the PSM control field 2800 may further include a link identifier 2810 in addition to the PSM control field 2700 illustrated in FIG. 27.

For example, the link identifier 2810 may be configured as a bitmap. Link identifier 2810 may be configured to correspond to the number of links. When the number of links is 3, the Link identifier 2810 may consist of 3 bits. Each bit may correspond to one link. In other words, the first link may be related/corresponding to the first bit of the Link identifier 2810. The second link may be related/corresponding to the second bit of the Link identifier 2810. The third link may be related/corresponding to the third bit of the Link identifier 2810.

When it is desired to control the operation of only some links rather than all links of the non-AP MLD, a link to be applied may be indicated as a link identifier 2810. When this is expressed in a bitmap, the link identifier 2810 may be a bit value indicated for each link, such as [1,1,0] and may be possible to control whether the operation is set or not. For example, the non-STR PSM may be controlled for the first link and the second link based on the PSM control field 2800, and may not be applied to the third link.

According to the above-described embodiment, the link having the non-STR capability may be changed based on the capability of the non-AP MLD. Therefore, by using the link identifier according to the changing situation, the non-AP MLD can change the setting related to the non-STR PSM.

Signaling Procedure of Non-STR PSM (Signaling Procedure)

The non-AP MLD and the AP MLD may exchange information related to the non-STR PSM based on the frame exchange and configure specific operations for the non-STR PSM. Hereinafter, a specific embodiment of the signaling process of the non-STR PSM may be described.

The non-STR PSM Capability field described below may mean a non-STR PSM Support field. In addition, the non-STR Control field described below may mean a non-STR PSM mode field. However, this is for the convenience of description, and is not limited to the above-described field.

Hereinafter, an example of a signaling procedure for the non-STR PSM between AP MLD 1 and non-AP MLD 1 may be described. AP MLD 1 may include AP 1 on link 1 and AP 2 on link 2. Non-AP MLD 1 may include STA 1 on link 1 and STA 2 on link 2. AP 1 and STA 1 may operate in link 1. AP 2 and STA 2 may operate in link 2. In other words, AP 1 and STA 1 may be connected through link 1. AP 2 and STA 2 may be connected through link 2.

Figure 29:
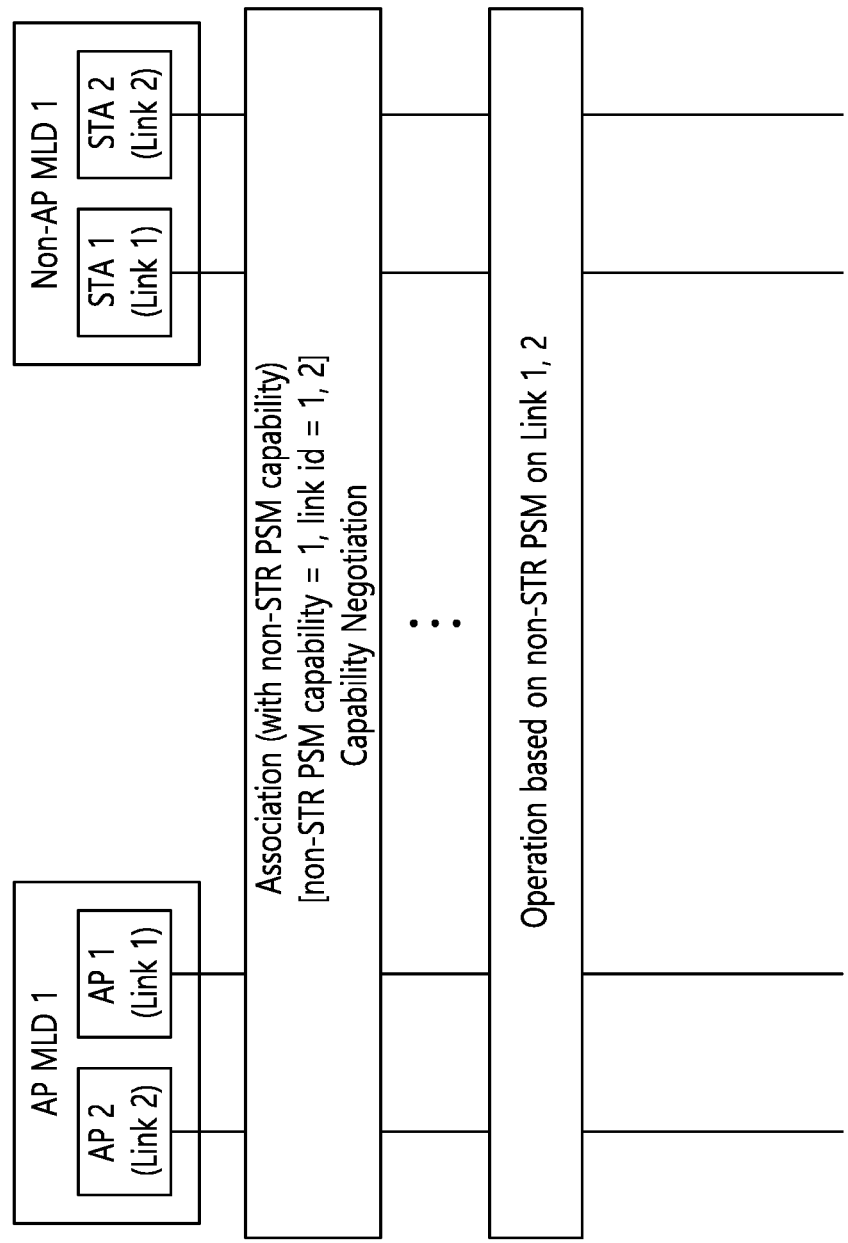
FIG. 29 shows an example of a signaling procedure for a non-STR PSM.

FIG. 29 shows an example of a signaling procedure for a non-STR PSM.

Referring to FIG. 29, AP MLD 1 and non-AP MLD 1 may perform signaling for the non-STR PSM in a link setup process. That is, AP MLD 1 and non-AP MLD 1 may indicate whether to support the non-STR PSM through capability negotiation in the link setup process. In other words, AP MLD 1 and non-AP MLD 1 may exchange information on whether to support the non-STR PSM through capability negotiation of a link setup process.

According to one embodiment, during the link setup process, non-AP MLD 1 may use a Request frame (for example, association request, and the like), so that the non-AP MLD 1 may indicate the non-STR PSM-related configuration only to STAs supporting the non-STR PSM function among its multiple STAs, and the non-AP MLD 1 may inform the AP MLD 1 of this.

Thereafter, Non-AP MLD 1 and AP MLD 1 may perform a capability negotiation process through frame exchange. For example, non-AP MLD 1 may set the value of non-STR PSM support for activating non-STR PSM capability to '1'. In addition, non-AP MLD 1 may set a Link id value as identifier information of STAs to be activated. Non-AP MLD 1 may transmit, to AP MLD 1, an association request including non-STR PSM support and Link ID configured as described above.

FIG. 29 shows an example in which link ID values 1 and 2 are included. That is, it may be an example in which non-STR PSM is supported in both link 1 and link 2.

Upon receiving this, AP MLD 1 may check information about it. AP MLD 1 may perform a consensus process by responding to the association request (for example, association response) to the non-AP MLD 1.

As described above, the STAs (for example, STA 1 and STA 2 of FIG. 29) agreed with AP MLD 1 (for example, AP 1 or AP 2) may then operate based on the non-STR PSM. Also, AP MLD 1 may operate as a non-STR PSM for non-AP MLD 1 in which non-STR PSM Support is set to 1.

For example, AP MLD 1 may know whether the non-STR PSM is supported by non-AP MLD 1 through capability negotiation. For the STA operating in the non-STR PSM, AP MLD 1 may buffer the BU without transmitting the BU until awake of the STA entering the doze by the non-STR PSM operation. In this case, if only the Link 1 identifier is included in the Link ID field of the Request frame, the non-STR PSM function may be activated only in STA 1. In other words, the non-AP MLD 1 may transmit only the Link 1 identifier by including only the Link 1 identifier in the Link ID field of the Request frame in order to activate the non-STR PSM function only in STA 1.

Figure 30:
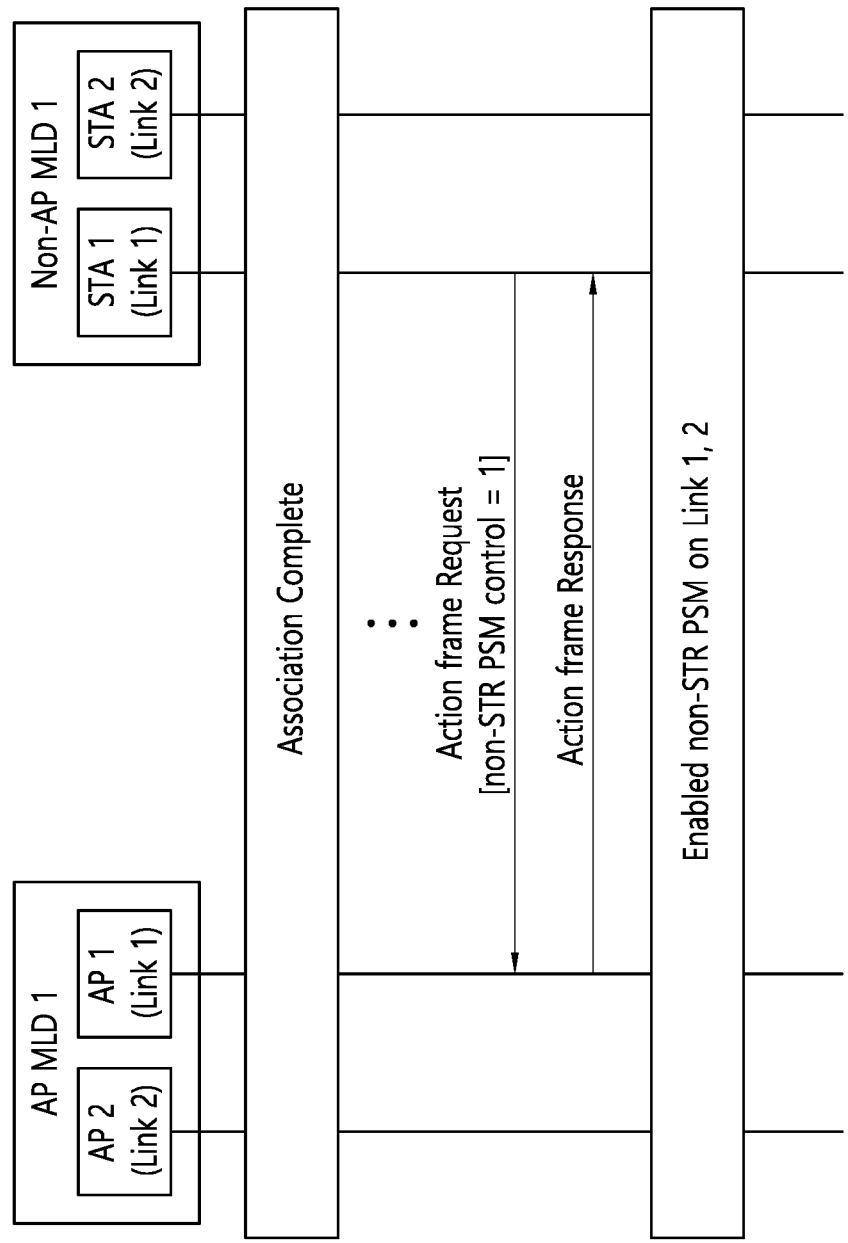
FIG. 30 shows another example of a signaling procedure for a non-STR PSM.

FIG. 30 shows another example of a signaling procedure for a non-STR PSM.

Referring to FIG. 30, AP MLD 1 and non-AP MLD 1 may perform signaling for non-STR PSM after a link setup process. That is, AP MLD 1 and non-AP MLD 1 may indicate whether the non-STR PSM is supported after the link setup process. In other words, AP MLD 1 and non-AP MLD 1 may exchange information on whether to support the non-STR PSM through capability negotiation after the link setup process.

For example, after the link setup process, STA 1 may indicate the non-STR PSM function by including the non-STR PSM mode field in the request frame (transmission frame (e.g. management frame, data frame, or QoS null frame, and the like) or separate frame (e.g. control frame)).

Even after link setup, the non-AP MLD 1 (for example, STA 1) may use the Control field to instruct the AP MLD 1 to various non-STR PSM-related operations along with whether to activate or deactivate the non-STR PSM function depending on the situation.

In addition, non-AP MLD 1 (for example, STA 1) may include Link or STA identifier information to be activated in the Link identifier or STA identifier field, so that it is possible to independently indicate whether the non-STR PSM function is active for each STA.

For example, when STA 1 wants to activate non-STR PSM for all STAs in non-AP MLD 1, STA 1 may transmit a request frame (Action frame or Action frame request) including only non-STR PSM control field/information without Link identifier or STA identifier information to AP 1. Upon receiving this, AP 1 may respond with a Response frame (Action frame or Action frame response) after checking the information included in the Request frame.

At this time, when the non-AP MLD 1 receives the Response frame for the grant, based on the Link identifier or STA identifier information included in the Response frame (or the request frame), STA 1 and STA 2 may activate the non-STR PSM function.

According to an embodiment, when link identifier information is not included in the request frame or response frame, this may mean that non-STR PSM activation is configured for all links (or all STAs) of non-AP MLD 1.

According to an embodiment, when the STA wants to reduce power consumption by entering a low power mode, the non-AP MLD 1 (for example, STA 1) may request the AP MLD 1 (for example, AP 1) to activate the non-STR PSM function as shown in FIG. 30.

According to one embodiment, unlike shown in FIG. 30, the non-AP MLD 1 (for example, STA 1) may request the non-STR PSM function deactivation to AP MLD 1 (for example, AP 1). For example, the capability of STA 1 may be changed from non-STR capability to STR capability. Therefore, in cases such as when the non-STR PSM function is no longer required, the non-AP MLD 1 (for example, STA 1) may request the non-STR PSM function deactivation to the AP MLD 1 (for example, AP 1). The above-described embodiment may be specifically described with reference to FIG. 31.

Figure 31:
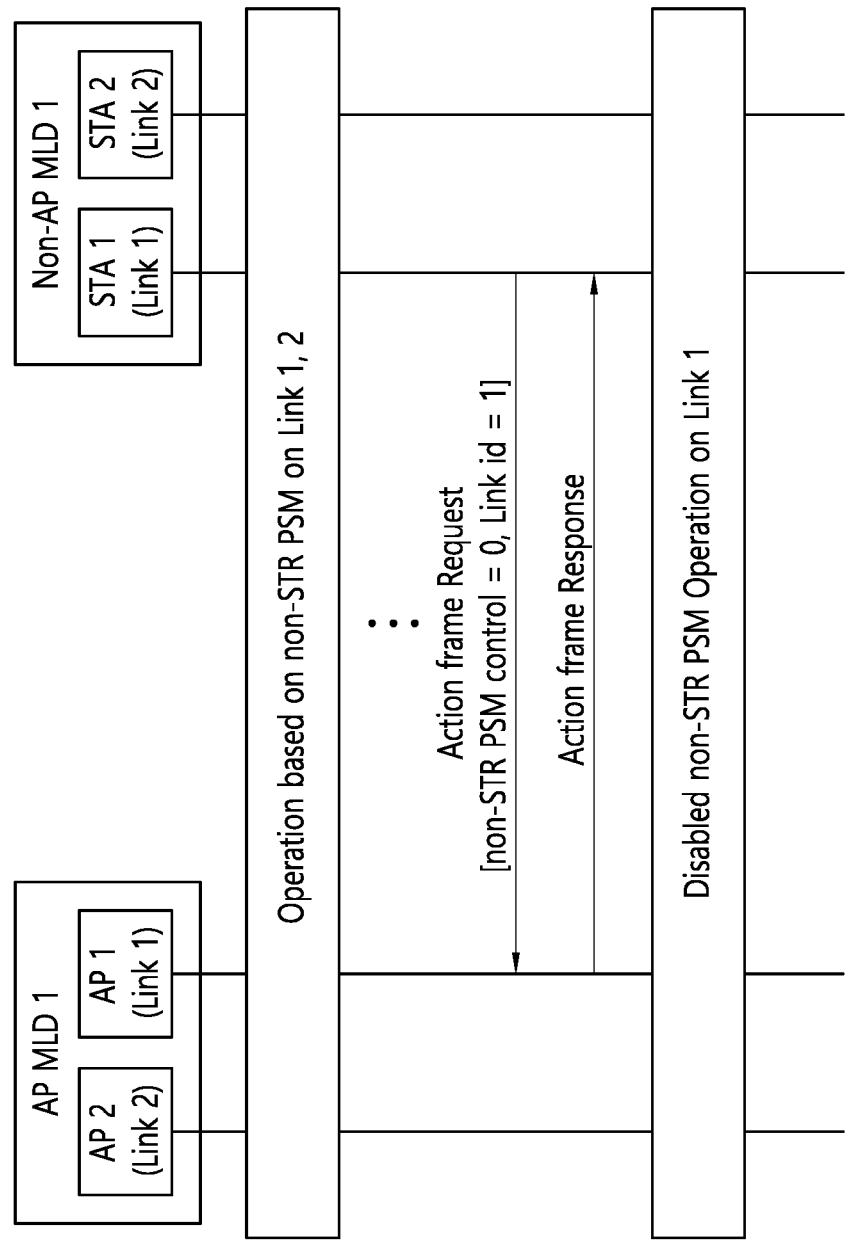
FIG. 31 shows another example of a signaling procedure for a non-STR PSM.

FIG. 31 shows another example of a signaling procedure for a non-STR PSM.

Referring to FIG. 31, AP MLD 1 and non-AP MLD 1 may perform signaling for non-STR PSM after a link setup process.

For example, after the link setup process, STA 1 may deactivate the non-STR PSM function by including the non-STR PSM mode field in the request frame (Transmission frame (e.g. management frame, data frame, or QoS null frame, and the like) or separate frame (e.g. control frame)).

When STA 1 independently wants to deactivate the non-STR PSM only for its STA, STA 1 may transmit, to AP 1, a request frame by including only its own identifier information and non-STR PSM control field information in link identifier or STA identifier information. A value of non-STR PSM control field information may be set to 0.

After receiving the Request frame, AP 1 may respond with a Response frame after checking the information included in the Request frame. At this time, when non-AP MLD 1 receives a response frame for approval, the non-AP MLD 1 may deactivate the non-STR PSM function of STA 1 based on Link identifier or STA identifier information included in the Response frame (or request frame). When there is no link identification information in the Response frame (or the request frame), Non-AP MLD 1 may deactivate non-STR PSM for all non-AP MLD links.

Figure 32:
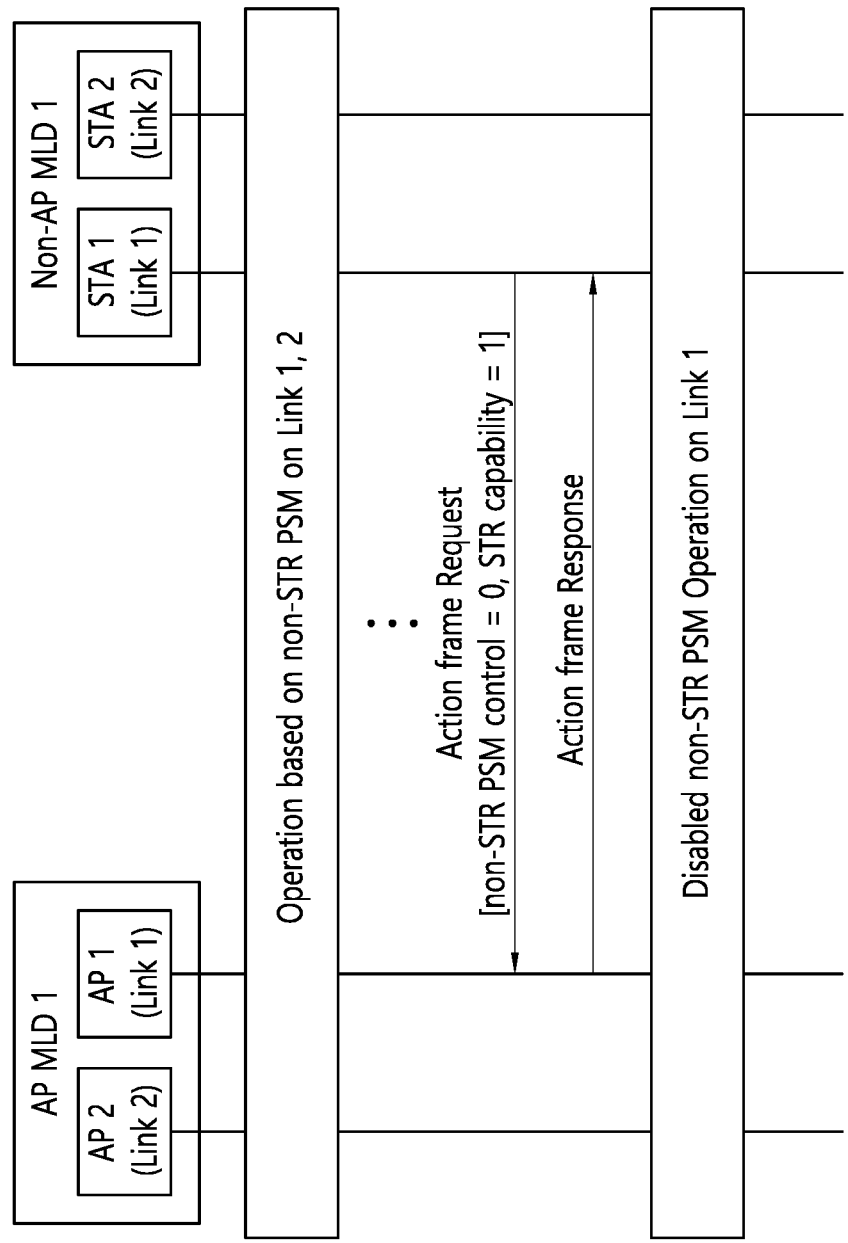
FIG. 32 shows another example of a signaling procedure for a non-STR PSM.

FIG. 32 shows another example of a signaling procedure for a non-STR PSM.

Referring to FIG. 32, AP MLD 1 and non-AP MLD 1 may indicate non-STR PSM deactivation based on a control field. In addition, the control field may include STR capability information.

When the STR capability of the non-AP MLD is determined in TXOP units (or when the STR capability is determined in each Channel access), the non-AP MLD may inform the AP MLD (for example, AP 1) of this information along with whether the non-STR PSM is activated.

For example, it is assumed that the existing non-AP MLD 1 does not support the STR capability and operates based on the non-STR PSM. In this case, based on the link environment change of the non-AP MLD 1, the non-AP MLD 1 may support STR capability. The non-AP MLD 1 may transmit information about the STR capability to the AP MLD 1 together with a request to deactivate the currently operating non-STR PSM.

The non-AP MLD 1 (for example, STA 1) may set the non-STR PSM Control field to 0, set the STR capability field to 1 in the Request frame (or action frame request), and then transmit the Request frame. In other words, non-AP MLD 1 may set the non-STR PSM Control field to 0 in order to deactivate the non-STR PSM. In addition, non-AP MLD 1 may set the STR capability field to 1 to indicate that the current state of the non-AP MLD is a state supporting STR capability.

The non-AP MLD 1 may know that the current state of the non-AP MLD 1 supports the STR capability, based on the Request frame. If the non-AP MLD 1 accepts the request, the non-AP MLD 1 may deactivate the non-STR PSM operation. In addition, since the non-AP MLD 1 now supports the STR capability, the AP MLD 1 may indicate the subsequent operation according to the support of the STR capability.

The above-described embodiment can be equally applied to the case of activating the non-STR PSM by changing the STR capability of the non-AP MLD to the non-STR capability, which is the opposite case.

Figure 33:
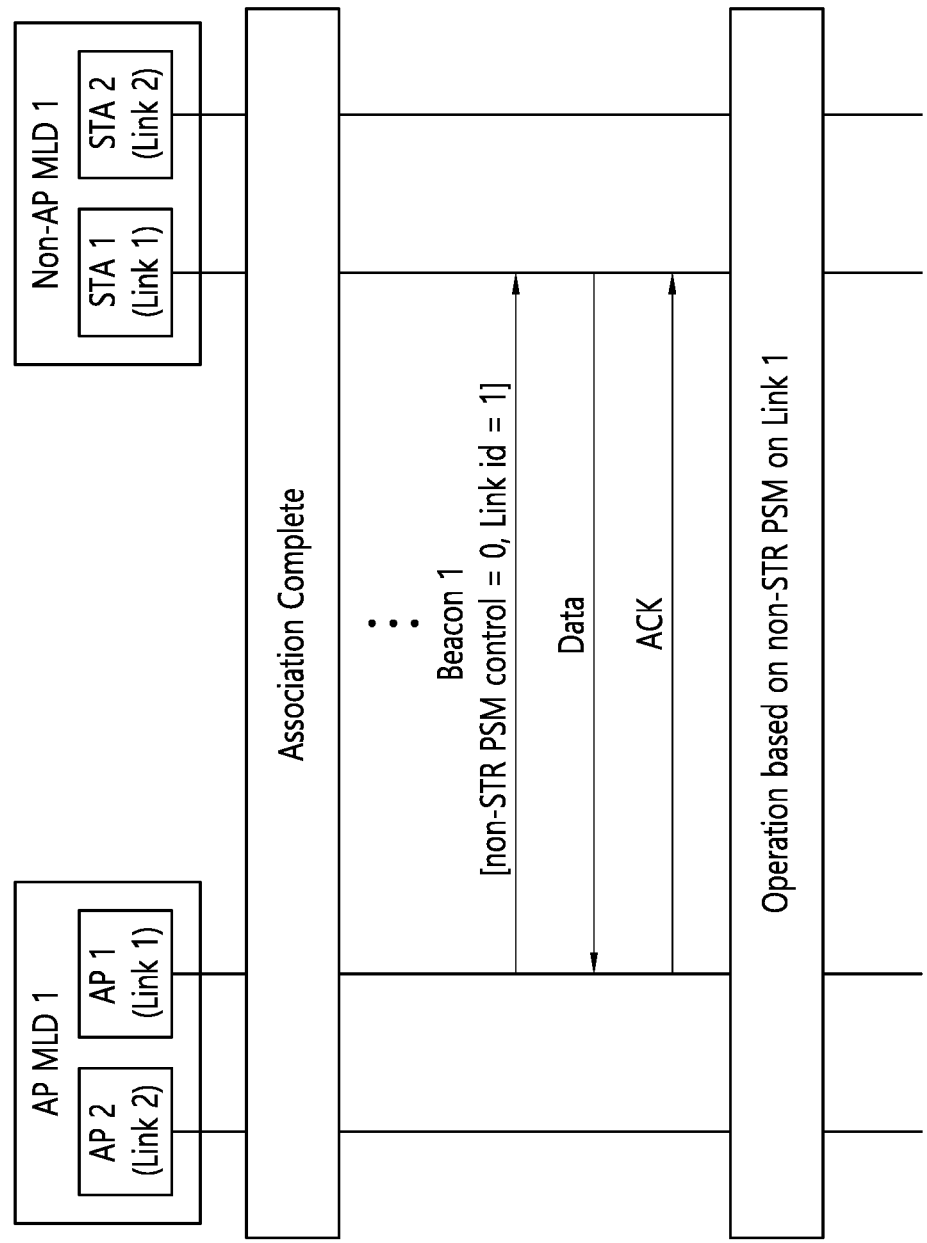
FIG. 33 shows another example of a signaling procedure for a non-STR PSM.

FIG. 33 shows another example of a signaling procedure for a non-STR PSM.

Referring to FIG. 33, AP MLD 1 (or non-AP MLD 1) may indicate whether to activate the non-STR PSM based on a beacon frame (for example, beacon 1) after the link setup process.

The example in FIG. 33 shows an example in which non-STR PSM activation is indicated based on the beacon frame, but is not limited thereto. According to an embodiment, it may be applied not only to the beacon frame, but also to various management frames or action frames including the aforementioned control field.

For example, AP MLD 1 may indicate whether to activate non-STR PSM based on the non-STR PSM mode field. In addition, AP MLD 1 may independently activate the non-STR PSM function for each STA by including link identifier or STA identifier information to be activated in the link identifier or STA identifier field.

As an example, AP 1 may indicate whether to activate the non-STR PSM for a link connected to the non-AP MLD 1 through one beacon using the characteristics of the MLD. That is, by setting the value of the non-STR PSM mode field to 1, it is possible to indicate whether to activate the non-STR PSM for the corresponding link.

The embodiment of FIG. 33 is an embodiment in which AP 1 activates the non-STR PSM only in link 1. After the frame exchange is completed, based on the above-described embodiment, only Link 1 (that is, STA 1) may operate based on the non-STR PSM.

Figure 34:
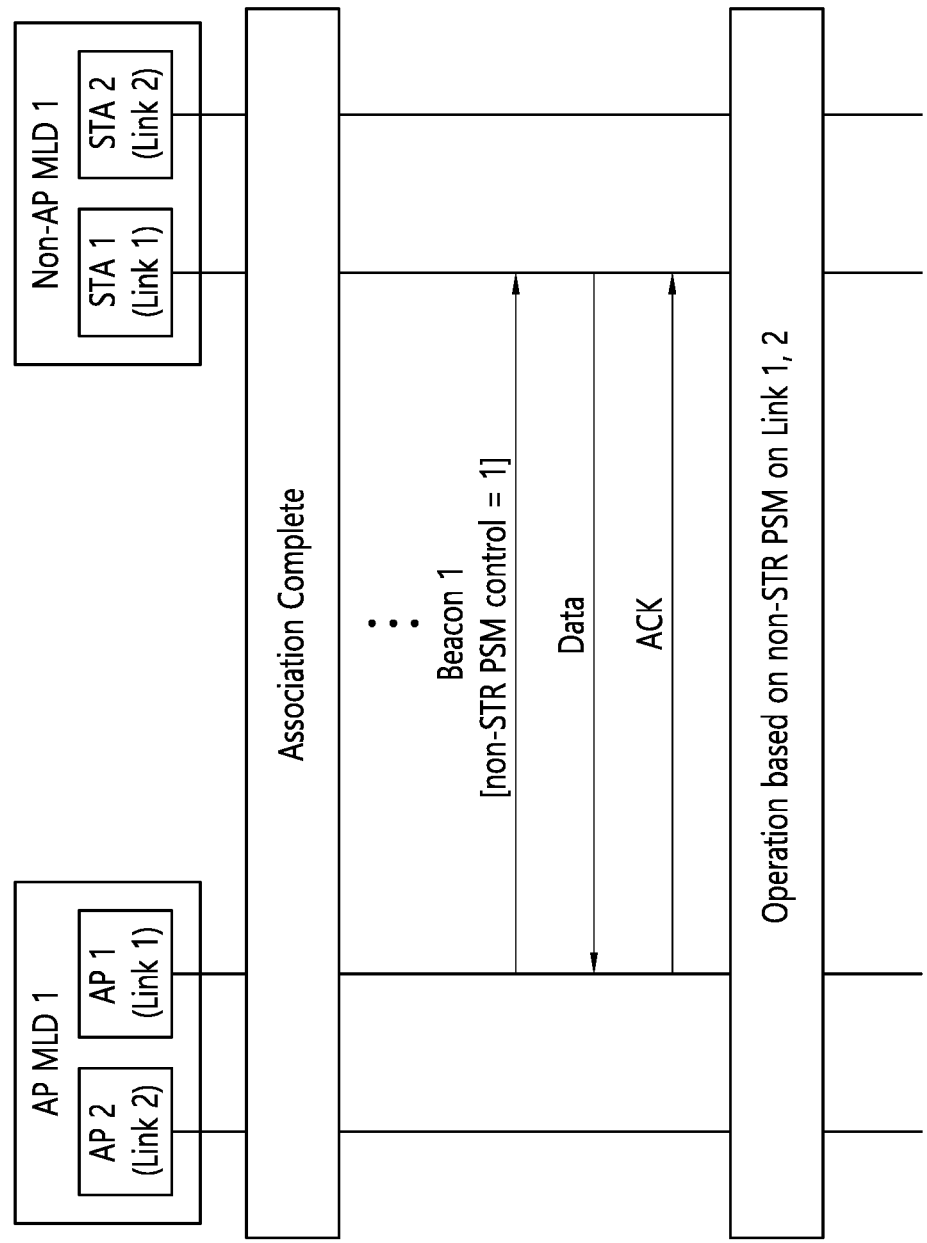
FIG. 34 shows another example of a signaling procedure for a non-STR PSM.

FIG. 34 shows another example of a signaling procedure for a non-STR PSM.

Referring to FIG. 34, AP MLD 1 (or non-AP MLD 1) may indicate whether to activate non-STR PSM based on a beacon frame (for example, beacon 1) after the link setup process (or association process).

AP MLD 1 may indicate whether non-STR PSM is activated by indicating whether non-STR PSM is activated in the non-STR PSM mode field. Unlike the embodiment of FIG. 33, Link identifier field information may not be included in the Beacon frame transmitted by AP MLD 1.

When non-STR PSM activation is indicated by including only non-STR PSM mode field information without a Link identifier field in the Beacon frame, whether to activate non-STR PSM may be indicated to all STAs in non-AP MLD 1 (for example, STAs 1 and 2). After the frame exchange is completed based on the above-described embodiment, both Link 1 and Link 2 may operate based on non-STR PSM.

Figure 35:
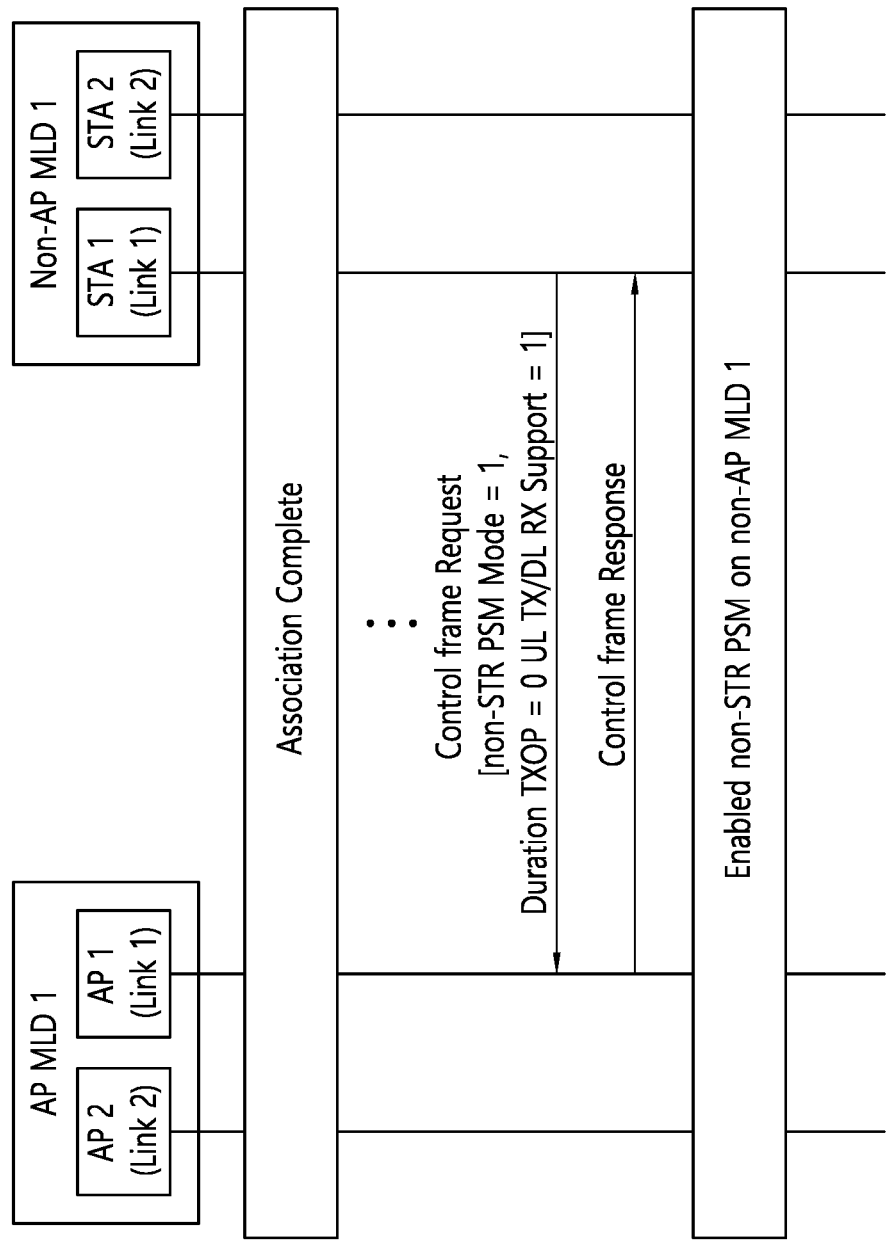
FIG. 35 shows another example of a signaling procedure for a non-STR PSM.

FIG. 35 shows another example of a signaling procedure for a non-STR PSM.

Referring to FIG. 35, the non-AP MLD 1 may dynamically change whether to activate its non-STR PSM mode and other settings based on a separate control frame.

The non-AP MLD 1 (for example, STA 1) may activate the non-STR PSM. Specifically, when the non-AP MLD 1 operates as a non-STR PSM, it may enter the doze during the PPDU Duration to activate the non-STR PSM for both UL TX and DL RX. Upon receiving the acknowledgment response frame from AP MLD 1, non-AP MLD 1 may operate according to its requested mechanism operation (non-STR PSM activation). If the non-AP MLD 1 receives a rejection response message, it may operate as an existing operation.

Figure 36:
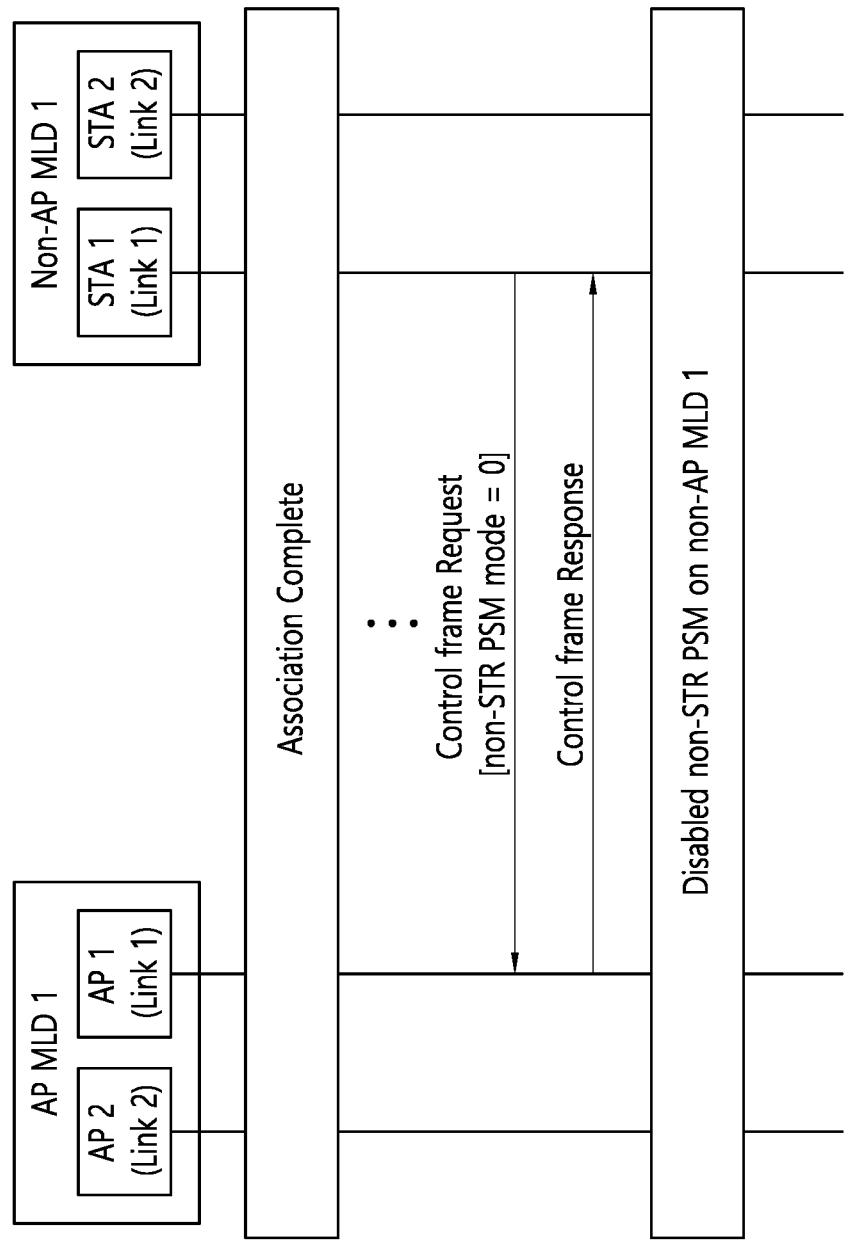
FIG. 36 shows another example of a signaling procedure for a non-STR PSM.

FIG. 36 shows another example of a signaling procedure for a non-STR PSM.

Referring to FIG. 36, the non-AP MLD 1 may dynamically change whether to activate its non-STR PSM mode and other settings based on a separate control frame.

The non-AP MLD 1 (for example, STA 1) may deactivate the non-STR PSM. Specifically, the non-AP MLD 1 receiving the grant response frame from the AP MLD 1 may operate according to its requested mechanism operation (non-STR PSM deactivation). If the non-AP MLD 1 receives a rejection response message, it may operate as an existing operation (non-STR PSM activation).

Through the above-described various embodiments, the AP/STA may request a non-STR power saving mechanism indication.

Figure 37:
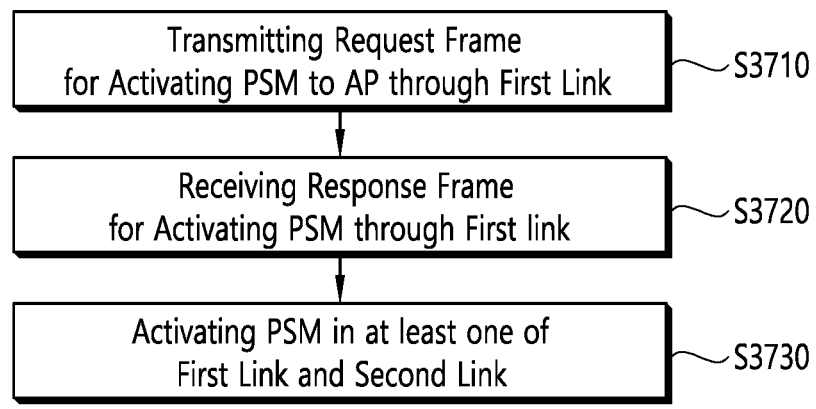
FIG. 37 is a flowchart for explaining the operation of a multi-link device.

FIG. 37 is a flowchart for explaining the operation of a multi-link device.

Referring to FIG. 37, in step S3710, a multi-link device (MLD) (for example, non-AP MLD 1) may transmit a request frame for activating a power saving mechanism (PSM) (or PSM mode) to an AP (for example, AP MLD 1, AP 1, or first AP) through the first link.

According to an embodiment, the multi-link device may include a first STA and a second STA. For example, the first STA may be associated with the first link. As an example, the first STA may operate in the first link. In other words, the first STA may be connected to the first link. For example, the second STA may be associated with the second link. As an example, the second STA may operate on the second link. In other words, the second STA may be connected to the second link.

According to an embodiment, the first link may be included in one of 2.4 GHz, 5 GHz, 6 GHz bands. In addition, the second link may also be included in one of the 2.4 GHz, 5 GHz, 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first STA may include a first processor and/or a first transceiver. Also, the second STA may include a second processor and/or a second transceiver.

For example, the first STA and the second STA may be controlled by the processor of the multi-link device and may operate by the processor of the multi-link device. For example, the processor of the multi-link device may request the processor of the first STA to transmit/receive a signal through the first link. The processor of the first STA may transmit/receive a signal through the first link in response to the request.

For another example, the first STA and the second STA may operate independently. For example, the first STA may perform communication through the first link based on the first processor and the first transceiver. In addition, the second STA may perform communication through the second link based on the second processor and the second transceiver. The processor of the multi-link device may transmit information necessary for the multi-link operation to the first STA or the second STA. The first STA or the second STA may perform a multi-link operation based on information necessary for the multi-link operation.

According to an embodiment, the multi-link device may transmit a request frame for activating the PSM to the AP through the first link in which the first STA operates.

For example, the request frame may include first information regarding PSM activation. The first information on PSM activation may include information for requesting entry into the PSM. As an example, the first information may consist of 1-bit information. The multi-link device may set the 1-bit information to a first value (for example, 1) in order to activate the PSM in the multi-link. The multi-link device may set the 1-bit information to a second value (for example, 0) in order to deactivate the PSM in the multi-link. That is, the multi-link device may transmit the 1-bit information to the AP to set whether to activate the PSM in the multi-link.

For example, the request frame may further include second information regarding a first identifier (ID) of a first link and a second ID of a second link. The multi-link device may use the second information to establish a link for activating the PSM. In other words, the multi-link device may transmit information about a link for activating the PSM based on the second information.

According to an embodiment, the multi-link device may set first information composed of 1-bit information as a first value in order to activate the PSM. In addition, the multi-link device may set second information for indicating a link for activating the PSM.

According to an embodiment, the second information may include at least one of a first ID and a second ID.

For example, the multi-link device may transmit a request frame by including the first ID in the second information, in order to activate the PSM in the first link.

As another example, the multi-link device may transmit a request frame by including the second ID in the second information, in order to activate the PSM in the second link.

According to an embodiment, the multi-link device may not include the ID assigned to each of the multi-links in the second information, in order to activate the PSM in all links in which the multi-link device operates. That is, the multi-link device may transmit the request frame without including both the first ID and the second ID in the second information, in order to activate the PSM in the first link and the second link in which the multi-link device operates.

According to an embodiment, the multi-link device may set first information composed of 1-bit information as a second value in order to deactivate the PSM. In addition, the multi-link device may set second information for indicating a link for deactivating the PSM.

According to an embodiment, the PSM may operate when simultaneous transmit and receive (STR) is not supported. For example, the PSM may include a non-STR PSM. The request frame may further include third information on whether STR is supported. When the multi-link device does not support STR, the non-STR PSM may be activated in at least one of the multi-links (for example, the first link and/or the second link) in order to avoid collision between links. When the non-STR PSM is activated in at least one link, collisions can be avoided and power consumption can be reduced.

According to an embodiment, the request frame may further include an A-control field. For example, the A-control field may include the first information and the second information. For example, the A-control field may further include various control information. As an example, the A-control field may further include at least one of information on an operating mode, link adaptation, and/or buffer status report.

In step S3720, the multi-link device (MLD) may receive a response frame for activating the PSM through the first link. In other words, the multi-link device may receive the response frame through the first STA. The response frame may include information about a response (or permission) to the PSM activation request.

In step S3730, the multi-link device (MLD) may activate the PSM in at least one of the first link and the second link based on the response frame.

For example, 1-bit information constituting the first information may be set as the first value, and the second information may include the second ID. The multi-link device may activate the PSM in the second link based on the second information including the second ID. That is, the multi-link device may transmit a request frame for requesting activation of the PSM in the second link. The multi-link device may receive a response frame in response to the request frame. The multi-link device may activate the PSM in the second link based on the response frame.

For example, 1-bit information constituting the first information may be set as the first value, and the second information may not include both the first ID and the second ID. The multi-link device may activate the PSM in both the first link and the second link, based on the second information that the second information does not include the first ID and the second ID.

According to an embodiment, the PSM (for example, non-STR PSM) may be configured to operate in various ways. For example, when the PSM (for example, non-STR PSM) is activated, at least one of the first link and the second link may operate in a doze state during TXOP. In other words, when the PSM (for example, non-STR PSM) is activated, at least one of the first link and the second link (or at least one of the first STA and the second STA) may operate in a doze state during the TXOP.

For another example, when the PSM (for example, non-STR PSM) is activated, at least one of the first link and the second link (or at least one of the first STA and the second STA) may operate in a doze state only during data transmission/reception in a link different from its own link. For example, the multi-link device may activate the PSM only on the second link. The multi-link device may operate the second link (or the second STA) in a doze state while data is transmitted/received through the first link.

According to an embodiment, the request frame and the response frame may be transmitted and received in various situations.

For example, when a multi-link device establishes a link connection with an AP (or an AP multi-link device), a request frame and a response frame may be transmitted/received (or exchanged).

For another example, the request frame and the response frame may be transmitted/received (or exchanged) in the form of an action frame after the multi-link device establishes a link connection with the AP (or AP multi-link device).

For another example, after the PSM is activated, the request frame and the response frame may be transmitted/received (or exchanged) to deactivate the activated PSM.

Figure 38:
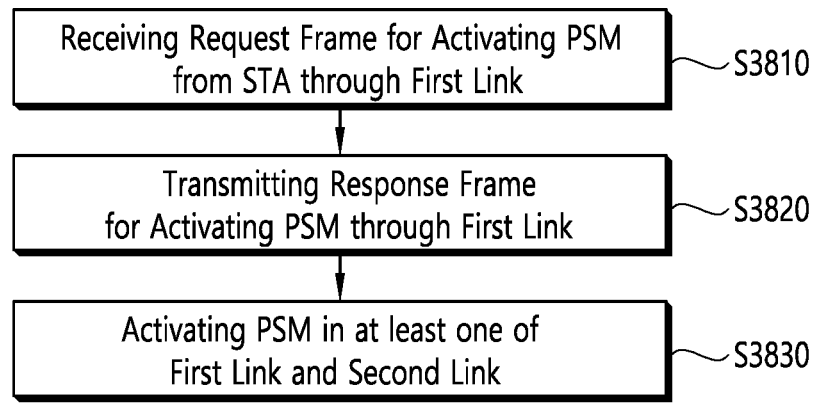
FIG. 38 is a flowchart for explaining the operation of an AP multi-link device.

FIG. 38 is a flowchart for explaining the operation of an AP multi-link device.

Referring to FIG. 38, in step S3810, the AP multi-link device (MLD) may receive a request frame for activating a power saving mechanism (PSM) (or PSM mode) from a STA (for example, the first STA) through the first link.

According to an embodiment, the AP multi-link device may include a first AP and a second AP. For example, a first AP may be associated with a first link. As an example, the first AP may operate in the first link. In other words, the first AP may be connected to the first link. For example, the second AP may be associated with the second link. As an example, the second AP may operate in the second link. In other words, the second AP may be connected to the second link.

According to an embodiment, the first link may be included in one of 2.4 GHz, 5 GHz, 6 GHz bands. In addition, the second link may also be included in one of the 2.4 GHz, 5 GHz, 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first AP may include a first processor and/or a first transceiver. Also, the second AP may include a second processor and/or a second transceiver.

For example, the first AP and the second AP may be controlled by the processor of the multi-link device and may operate by the processor of the multi-link device. For example, the processor of the multi-link device may request the processor of the first AP to transmit/receive a signal through the first link. The processor of the first AP may transmit/receive a signal through the first link in response to the request.

For another example, the first AP and the second AP may operate independently. For example, the first AP may perform communication through the first link based on the first processor and the first transceiver. In addition, the second AP may perform communication through the second link based on the second processor and the second transceiver. The processor of the multi-link device may transmit information necessary for the multi-link operation to the first AP or the second AP. The first AP or the second AP may perform a multi-link operation based on information necessary for the multi-link operation.

According to an embodiment, the AP multi-link device may receive a request frame for activating the PSM of the AP through the first link in which the first AP operates.

For example, the request frame may include first information regarding PSM activation. The first information on PSM activation may include information for requesting entry into the PSM. As an example, the first information may consist of 1-bit information.

The 1-bit information may include information on whether to activate in a multi-link. When the 1-bit information is set to a first value (for example, 1), it may mean an activation request of the PSM. When the 1-bit information is set to a second value (for example, 0), it may mean a PSM deactivation request.

For example, the request frame may further include second information regarding a first identifier (ID) of a first link and a second ID of a second link. The second information may be used to establish a link for activating the PSM. In other words, the AP multi-link device may receive information about a link for activating the PSM based on the second information.

According to an embodiment, in order to activate the PSM, first information composed of 1-bit information may be set as a first value. In addition, second information for indicating a link for activating the PSM may be set.

According to an embodiment, the second information may include at least one of a first ID and a second ID.

For example, the AP multi-link device may confirm that the first ID is included in the second information. The AP multi-link device may confirm that PSM activation is requested for the first link, based on the second information.

As another example, the AP multi-link device may confirm that the second ID is included in the second information. The AP multi-link device may confirm that PSM activation is requested for the second link, based on the second information.

According to an embodiment, the second information may not include an ID assigned to each of the multi-links. For example, the AP multi-link device may confirm that both the first ID and the second ID are not included in the second information. The AP multi-link device may confirm that PSM activation is requested for the first link and the second link based on the second information.

According to an embodiment, the first information composed of 1-bit information may be set as the second value. In addition, second information for indicating a link for deactivating the PSM may be set.

According to an embodiment, the PSM may operate when simultaneous transmit and receive (STR) is not supported. For example, the PSM may include a non-STR PSM. The request frame may further include third information on whether STR is supported. If the multi-link device (for example, the first STA or the second STA) does not support the STR, the AP multi-link device may activate the non-STR PSM in at least one of the multi-links (for example, the first link and/or the second link) in order to avoid collision between links. When the non-STR PSM is activated in at least one link, collisions can be avoided and power consumption can be reduced.

According to an embodiment, the request frame may further include an A-control field. For example, the A-control field may include the first information and the second information. For example, the A-control field may further include various control information. As an example, the A-control field may further include at least one of information on an operating mode, link adaptation, and/or buffer status report.

In step S3820, the AP multi-link device may transmit a response frame for activating the PSM through the first link. In other words, the AP multi-link device may transmit the response frame through the first STA. The response frame may include information about a response (or permission) to the PSM activation request.

In step S3830, the AP multi-link device (MLD) may activate the PSM in at least one of the first link and the second link based on the response frame.

For example, 1-bit information constituting the first information may be set as the first value, and the second information may include the second ID. The AP multi-link device may activate the PSM for the second link based on the second information including the second ID. That is, the AP multi-link device may receive a request frame for requesting activation of the PSM for the second link. The AP multi-link device may transmit a response frame in response to the request frame. The AP multi-link device may activate the PSM in the second link based on the response frame.

For example, 1-bit information constituting the first information may be set as the first value, and the second information may not include both the first ID and the second ID. The AP multi-link device may activate the PSM in both the first link and the second link, based on the second information that the second information does not include the first ID and the second ID.

According to an embodiment, the PSM (for example, non-STR PSM) may be configured to operate in various ways. For example, when the PSM (for example, non-STR PSM) is activated (or in the PSM activated state), at least one of the first link and the second link (or at least one of the first AP and the second AP)) may operate in a sleep state during TXOP. In other words, in the active state of the PSM (for example, non-STR PSM), at least one of the first link and the second link may operate in a sleep state during the TXOP. In other words, after the PSM (for example, non-STR PSM) is activated, at least one of the first link and the second link may operate in a sleep state during TXOP. In other words, after the PSM (for example, non-STR PSM) is activated, at least one of the first link and the second link may operate in a sleep state during TXOP.

For another example, when the PSM (for example, non-STR PSM) is activated, at least one of the first link and the second link may operate in a sleep state only during data transmission/reception in a link different from its own link. For example, the AP multi-link device may activate the PSM only on the second link. The AP multi-link device may operate the second link (or the second AP) in a sleep state while data is transmitted/received through the first link.

According to an embodiment, the request frame and the response frame may be transmitted and received in various situations.

For example, when a multi-link device establishes a link connection with an AP (or an AP multi-link device), a request frame and a response frame may be transmitted/received (or exchanged).

For another example, the request frame and the response frame may be transmitted/received (or exchanged) in the form of an action frame after the multi-link device establishes a link connection with the AP (or AP multi-link device).

For another example, after the PSM is activated, the request frame and the response frame may be transmitted/received (or exchanged) to deactivate the activated PSM.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present disclosure includes a processor and a memory coupled to the processor. The processor may be configured to transmit a request frame for activating a power saving mechanism (PSM) to an access point (AP) through a first link in which a first STA operates, wherein the request frame includes first information on PSM activation, and wherein the request frame further includes second information on a first identifier (ID) of the first link and a second ID of a second link in which a second STA operates; receive a response frame for activating the PSM through the first link; and activate the PSM in at least one of the first link and the second link based on the response frame.

The technical features of the present disclosure may be implemented based on a computer readable medium (CRM). For example, a CRM proposed by the present disclosure may store instructions which perform operations including the steps of transmitting a request frame for activating a power saving mechanism (PSM) to an access point (AP) through a first link in which a first STA operates, wherein the request frame includes first information on PSM activation, and wherein the request frame further includes second information on a first identifier (ID) of the first link and a second ID of a second link in which a second STA operates; receiving a response frame for activating the PSM through the first link; and activating the PSM in at least one of the first link and the second link based on the response frame. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a multi-link device (MLD) including a first station (STA) and a second STA in a wireless local area network system, the method comprising:
   transmitting a request frame for activating a power saving mechanism (PSM) to an access point (AP) through a first link in which the first STA operates,
   wherein the request frame includes first information on PSM activation, and
   wherein the request frame further includes second information on a first identifier (ID) of the first link and a second ID of a second link in which the second STA operates;
   receiving a response frame for activating the PSM through the first link; and
   activating the PSM in at least one of the first link and the second link based on the response frame.

2. The method of claim 1,
   wherein the PSM operates based on simultaneous transmit and receive (STR) being not supported.

3. The method of claim 2,
   wherein the request frame includes third information on whether STR is supported.

4. The method of claim 1,
   wherein at least one of the first link and the second link operates in a doze state during a transmission opportunity (TXOP), after the PSM is activated.

5. The method of claim 1,
   wherein the first information on the PSM activation consists of 1-bit information, and
   wherein the 1-bit information is configured to a first value.

6. The method of claim 1,
   wherein the second information includes at least one of the first ID and the second ID.

7. The method of claim 6, wherein the method further comprises,
   activating the PSM in the second link, based on the second information including the second ID.

8. The method of claim 1, wherein the method further comprises,
   activating the PSM in the first link and the second link, based on the second information not including both the first ID and the second ID.

9. The method of claim 1,
   wherein the first link is included in one of 2.4 GHz, 5 GHz, and 6 GHz bands, and
   wherein the second link is included in one of the 2.4 GHz, 5 GHz, and 6 GHz bands.

10. The method of claim 1,
    wherein the request frame further includes an A-control field, and
    wherein the first information and the second information are included in the A-control field.

11. A multi-link device (MLD) in a wireless local area network system, the MLD comprising:
    a first station (STA) operating in a first link among a multi-link;
    a second STA operating in a second link among the multi-link; and
    a processor coupled to the first STA and the second STA, wherein the processor is adapted to,
    transmit a request frame for activating a power saving mechanism (PSM) to an access point (AP) through the first link,
    wherein the request frame includes first information on PSM activation, and
    wherein the request frame further includes second information on a first identifier (ID) of the first link and a second ID of the second link;
    receive a response frame for activating the PSM through the first link; and activate the PSM in at least one of the first link and the second link based on the response frame.

12. The MLD of claim 11, wherein the PSM operates based on simultaneous transmit and receive (STR) being not supported.

13. The MLD of claim 12, wherein the request frame includes third information on whether STR is supported.

14. The MLD of claim 11, wherein at least one of the first link and the second link operates in a doze state during a transmission opportunity (TXOP), after the PSM is activated.

15. The MLD of claim 11, wherein the first information on the PSM activation consists of 1-bit information, and wherein the 1-bit information is configured to a first value.

16. The MLD of claim 11, wherein the processor is further adapted to,
activate the PSM in the first link and the second link, based on the second information not including both the first ID and the second ID.

\* \* \* \* \*